US012154214B2

(12) United States Patent
Muthler et al.

(10) Patent No.: US 12,154,214 B2
(45) Date of Patent: Nov. 26, 2024

(54) GENERATION AND TRAVERSAL OF PARTIAL ACCELERATION STRUCTURES FOR RAY TRACING

(71) Applicant: NVIDIA Corporation, Santa Clara, CA (US)

(72) Inventors: Gregory Muthler, Chapel Hill, NC (US); John Burgess, Austin, TX (US); Magnus Andersson, Lund (SE); Timo Viitanen, Uusimaa (FI); Levi Oliver, Cambridge, MA (US)

(73) Assignee: NVIDIA Corporation, Santa Clara, CA (US)

( * ) Notice: Subject to any disclaimer, the term of this patent is extended or adjusted under 35 U.S.C. 154(b) by 50 days.

(21) Appl. No.: 17/941,578

(22) Filed: Sep. 9, 2022

(65) Prior Publication Data

US 2024/0087211 A1 Mar. 14, 2024

(51) Int. Cl.
*G06T 15/06* (2011.01)
*G06T 15/00* (2011.01)
*G06T 17/00* (2006.01)

(52) U.S. Cl.
CPC ............ *G06T 15/06* (2013.01); *G06T 15/005* (2013.01); *G06T 17/005* (2013.01)

(58) Field of Classification Search
None
See application file for complete search history.

(56) References Cited

U.S. PATENT DOCUMENTS

| 8,289,324 B1* | 10/2012 | Laine .................. G06T 17/005 345/426 |
| 9,569,559 B2 | 2/2017 | Karras et al. |
| 9,582,607 B2 | 2/2017 | Laine et al. |
| 10,025,879 B2 | 7/2018 | Karras et al. |
| 10,032,289 B2 | 7/2018 | Laine et al. |
| 10,235,338 B2 | 3/2019 | Laine et al. |
| 10,242,485 B2 | 3/2019 | Karras et al. |
| 10,580,196 B1 | 3/2020 | Muthler et al. |
| 10,740,952 B2 | 8/2020 | Laine et al. |
| 10,810,785 B2 | 10/2020 | Muthler et al. |
| 10,825,230 B2 | 11/2020 | Laine et al. |
| 10,825,232 B2 | 11/2020 | Muthler et al. |
| 10,866,990 B2 | 12/2020 | Lehtinen et al. |
| 10,867,429 B2 | 12/2020 | Laine et al. |

(Continued)

OTHER PUBLICATIONS

Vlastimil Havran, Jiri Bittner, "Stackless Ray Traversal for kD-Trees with Sparse Boxes", Nov. 17, 2007, Computer Graphics & Geometry, vol. 9, Issue 3, pp. 16-30.*

(Continued)

*Primary Examiner* — Robert Bader
(74) *Attorney, Agent, or Firm* — Nixon & Vanderhye P.C.

(57) ABSTRACT

An alternate root tree or graph structure for ray and path tracing enables dynamic instancing build time decisions to split any number of geometry acceleration structures in a manner that is developer transparent, nearly memory storage neutral, and traversal efficient. The resulting traversals only need to partially traverse the acceleration structure, which improves efficiency. One example use reduces the number of false positive instance acceleration structure to geometry acceleration structure transitions for many spatially separated instances of the same geometry.

18 Claims, 21 Drawing Sheets

(56) References Cited

U.S. PATENT DOCUMENTS

| | | | |
|---|---|---|---|
| 10,885,698 B2 | 1/2021 | Muthler et al. | |
| 11,113,790 B2 | 9/2021 | Marrs et al. | |
| 11,138,009 B2 | 10/2021 | Babich, Jr. et al. | |
| 11,157,414 B2 | 10/2021 | Muthler et al. | |
| 11,164,360 B2 | 11/2021 | Laine et al. | |
| 11,189,075 B2 | 11/2021 | Laine et al. | |
| 11,200,725 B2 | 12/2021 | Muthler et al. | |
| 11,282,261 B2 | 3/2022 | Muthler et al. | |
| 11,295,508 B2 | 4/2022 | Muthler et al. | |
| 11,302,056 B2 | 4/2022 | Muthler et al. | |
| 11,328,472 B2 | 5/2022 | Laine et al. | |
| 2008/0158227 A1* | 7/2008 | Reshetov | G06T 15/06 345/426 |
| 2016/0070767 A1 | 3/2016 | Karras et al. | |
| 2016/0070820 A1 | 3/2016 | Laine et al. | |
| 2017/0116760 A1* | 4/2017 | Laine | G06T 9/001 |
| 2020/0051317 A1* | 2/2020 | Muthler | G06N 5/02 |

OTHER PUBLICATIONS

Foley, Van Dam, Hughes et al, Computer Graphics: Principles and Practice (2d Ed. Addison-Wesley 1995 & 3d Ed. Addison-Wesley 2014).

Appel, "Some Techniques for Shading Machine Renderings of Solids" (SJCC 1968) pp. 37-45, 1968.

Whitted, "An Improved Illumination Model for Shaded Display" pp. 343-349 Communications of the ACM vol. 23 Issue 6 (Jun. 1980).

Kajiya, "The Rendering Equation", Computer Graphics (SIGGRAPH 1986 Proceedings, vol. 20, pp. 143-150) 1986.

Hery et al, "Towards Bidirectional Path Tracing at Pixar" (2016).

Parker et al., "OptiX: A General Purpose Ray Tracing Engine" (ACM Transactions on Graphics, vol. 29, No. 4, Article 66, Jul. 2010).

NVIDIA Optix Ray Tracing Engine, https://developer.nvidia.com/rtx/ray-tracing/optix, Feb. 11, 2022.

Sjoholm, "Best Practices: Using NVIDIA RTX Ray Tracing", https://developer.nvidia.com/blog/best-practices-using-nvidia-rtx-ray-tracing/; Aug. 10, 2020.

"DX12 Raytracing tutorial—Part 1", https://developer.nvidia.com/rtx/raytracing/dxr/dx12-raytracing-tutorial-part-1, Jun. 13, 2021.

Wyman et al, "Introduction to DirectX Raytracing" In: Haines, E., Akenine-Möller, T. (eds) Ray Tracing Gems. Apress, Berkeley, CA. https://doi.org/10.1007/978-1-4842-4427-2_3 (2019).

GeForce RTX, Ultimate Ray Tracing & AI, https://www.nvidia.com/en-us/geforce/rtx/, Sep. 6, 2021.

Lefrancois et al, NVIDIA Vulkan Ray Tracing Tutorial, Dec. 2019.

"NVIDIA Vulkan Ray Tracing Tutorial", https://developer.nvidia.com/rtx/raytracing/vkray, Jul. 3, 2021.

Woop, "A Ray Tracing Hardware Architecture for Dynamic Scenes", Universitat des Saarlandes, 2004.

* cited by examiner

Instanced Acceleration Structure

Normal traversal

Traversal with 4 alternate root complets

Complet Data Structure

Complet Misc Field Data Structure

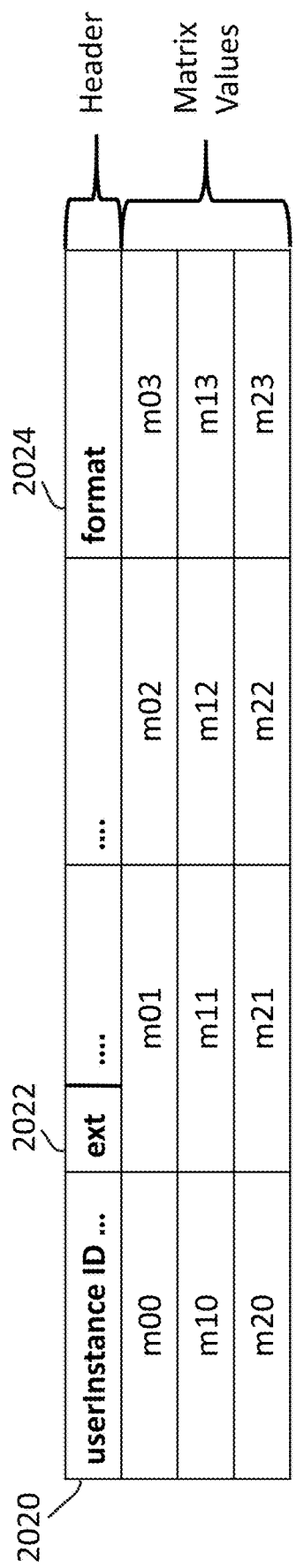
FIG 6C
Instance Node Data Structure
FIG 6D
Extended Header Data Structure

| Stack Restore Entry 0 | meta ... | L | A | ... |
| Stack Restore Entry 1 | meta ... | L | A | ... |
| Stack Restore Entry 2 | meta ... | L | A | ... |
| Stack Restore Entry 3 | meta ... | L | A | ... |
| Stack Restore Entry 4 | meta ... | L | A | ... |
| Stack Restore Entry 5 | meta ... | L | A | ... |
| ... | | | | |
| Stack Restore Entry n | meta ... | L | A | ... |

FIG 6E
Stack Data Structure

| Complet Pointer | Complet Child | Instance Pointer | |
|---|---|---|---|
| Triangle Pointer | Complet child | a | complet |
| | | a | Triangle range complet |

2036

FIG 6F
Stack Initialization Data Structure

Example Ray Tracing Shading Pipeline

FIG. 12 TRAVERSAL COPROCESSOR

TTU Processing

Example Process To Generate an Image

Fully Connected Mesh

GENERATION AND TRAVERSAL OF PARTIAL ACCELERATION STRUCTURES FOR RAY TRACING

CROSS-REFERENCE TO RELATED PATENTS AND APPLICATIONS

Field

The present technology relates to computer graphics, and more particularly to ray tracers. More particularly, the technology relates to hardware acceleration of computer graphics processing including but not limited to hardware based real time or close to real time ray and path tracing. The example non-limiting technology herein further provides instanced acceleration structures for accelerating ray and path tracing that define traversal topologies to increase the efficiency of ray tracer intersection testing.

BACKGROUND & SUMMARY

Real time computer graphics have advanced tremendously over the last few decades. With the development in the 1980's of powerful graphics processing units (GPUs) providing 3D hardware graphics pipelines, it became possible to produce 3D graphical displays based on texture-mapped polygon primitives in real time response to user input. Such real time graphics processors were built upon a technology called scan conversion rasterization, which is a means of determining visibility from a single point or perspective. Using this approach, three-dimensional objects are modelled from surfaces constructed of geometric primitives, typically polygons such as triangles. The scan conversion process establishes and projects primitive polygon vertices onto a view plane and fills in the points inside the edges of the primitives. See e.g., Foley, Van Dam, Hughes et al, Computer Graphics: Principles and Practice (2d Ed. Addison-Wesley 1995 & 3d Ed. Addison-Wesley 2014).

Hardware has long been used to determine how each polygon surface should be shaded and texture-mapped and to rasterize the shaded, texture-mapped polygon surfaces for display. Typical three-dimensional scenes are often constructed from millions of polygons. Fast modern GPU hardware can efficiently process many millions of graphics primitives for each display frame (every $1/30^{th}$ or $1/60^{th}$ of a second) in real time response to user input. The resulting graphical displays have been used in a variety of real time graphical user interfaces including but not limited to augmented reality, virtual reality, video games and medical imaging. But traditionally, such interactive graphics hardware has not been able to accurately model and portray reflections and shadows.

There is another graphics technology which does perform physically realistic visibility determinations for reflection and shadowing. It is called "ray tracing". Ray tracing refers to casting a ray into a scene and determining whether and where that ray intersects the scene's geometry. This basic ray tracing visibility test is the fundamental primitive underlying a variety of rendering algorithms and techniques in computer graphics. Ray tracing was developed at the end of the 1960's and was improved upon in the 1980's. See e.g., Appel, "Some Techniques for Shading Machine Renderings of Solids" (SJCC 1968) pp. 27-45; Whitted, "An Improved Illumination Model for Shaded Display" Pages 343-349 Communications of the ACM Volume 23 Issue 6 (June 1980); and Kajiya, "The Rendering Equation", Computer Graphics (SIGGRAPH 1986 Proceedings, Vol. 20, pp. 143-150). Since then, ray tracing has been used in non-real time graphics applications such as design and film making. Anyone who has seen "Finding Dory" (2016) or other Pixar animated films has seen the result of the ray tracing approach to computer graphics—namely realistic shadows and reflections. See e.g., Hery et al, "Towards Bidirectional Path Tracing at Pixar" (2016).

Generally, ray tracing is a rendering method in which rays are used to determine the visibility of various elements in the scene. Ray tracing is a primitive used in a variety of rendering algorithms including for example path tracing and Metropolis light transport. In an example algorithm, ray tracing simulates the physics of light by modeling light transport through the scene to compute all global effects (including for example reflections from shiny surfaces) using ray optics. In such uses of ray tracing, an attempt may be made to trace each of many hundreds or thousands of light rays as they travel through the three-dimensional scene from potentially multiple light sources to the viewpoint. Often, such rays are traced relative to the eye through the scene and tested against a database of all geometry in the scene. The rays can be traced forward from lights to the eye, or backwards from the eye to the lights, or they can be traced to see if paths starting from the virtual camera and starting at the eye have a clear line of sight. The testing determines either the nearest intersection (in order to determine what is visible from the eye) or traces rays from the surface of an object toward a light source to determine if there is anything intervening that would block the transmission of light to that point in space. Because the rays are similar to the rays of light in reality, they make available a number of realistic effects that are not possible using the raster based real time 3D graphics technology that has been implemented over the last thirty years. Because each illuminating ray from each light source within the scene is evaluated as it passes through each object in the scene, the resulting images can appear as if they were photographed in reality. Accordingly, these ray tracing methods have long been used in professional graphics applications such as design and film, where they have come to dominate over raster-based rendering.

Ray tracing can be used to determine if anything is visible along a ray (for example, testing for occluders between a shaded point on a geometric primitive and a point on a light source) and can also be used to evaluate reflections (which may for example involve performing a traversal to determine the nearest visible surface along a line of sight so that software can evaluate a material shading function corresponding to what was hit—which in turn can launch one or more additional rays into the scene according to the material properties of the object that was intersected) to determine the light returning along the ray back toward the eye. In classical Whitted-style ray tracing, rays are shot from the viewpoint through the pixel grid into the scene, but other path traversals are possible. Typically, for each ray, the closest object is found. This intersection point can then be determined to be illuminated or in shadow by shooting a ray from it to each light source in the scene and finding if any objects are in between. Opaque objects block the light, whereas transparent objects attenuate it. Other rays can be spawned from an intersection point. For example, if the intersecting surface is shiny or specular, rays are generated in the reflection direction. The ray may accept the color of the first object intersected, which in turn has its intersection point tested for shadows. This reflection process is recursively repeated until a recursion limit is reached or the potential contribution of subsequent bounces falls below a threshold. Rays can also be generated in the direction of refraction for transparent solid objects, and again recursively evaluated. Ray tracing technology thus allows a graphics system to develop physically correct reflections and shadows that are not subject to the limitations and artifacts of scan conversion techniques.

Ray tracing has been used together with or as an alternative to rasterization and z-buffering for sampling scene geometry. It can also be used as an alternative to (or in combination with) environment mapping and shadow texturing for producing more realistic reflection, refraction and shadowing effects than can be achieved via texturing techniques or other raster "hacks". Ray tracing may also be used as the basic primitive to accurately simulate light transport in physically-based rendering algorithms such as path tracing, photon mapping, Metropolis light transport, and other light transport algorithms.

The main challenge with ray tracing in the past has generally been speed. Ray tracing requires the graphics system to compute and analyze, for each frame, each of many millions of light rays impinging on (and potentially reflected by) each surface making up the scene. In the past, this enormous amount of computation complexity was impossible to perform in real time.

One reason modern GPU 3D graphics pipelines are so fast at rendering shaded, texture-mapped surfaces is that they use coherence efficiently. In conventional scan conversion, everything is assumed to be viewed through a common window in a common image plane and projected down to a single vantage point. Each triangle or other primitive is sent through the graphics pipeline and covers some number of pixels. All related computations can be shared for all pixels rendered from that triangle. Rectangular tiles of pixels corresponding to coherent lines of sight passing through the window may thus correspond to groups of threads running in lock-step. All the pixels falling between the edges of the triangle are assumed to be the same material running the same shader and fetching adjacent groups of texels from the same textures.

In ray tracing, in contrast, rays may start or end at a common point (a light source, or a virtual camera lens) but as they propagate through the scene and interact with different materials, they quickly diverge. For example, each ray performs a search to find the closest object. Some caching and sharing of results can be performed, but because each ray potentially can hit different objects, the kind of coherence that GPU's have traditionally taken advantage of in connection with rasterizing texture mapped, shaded triangles is not present (e.g., a common vantage point, window and image plane are not there for ray tracing). This makes ray tracing much more computationally challenging than other graphics approaches—and therefore much more difficult to perform on an interactive real time basis.

However, after many decades of hard work, NVIDIA and other hardware manufacturers are now offering hardware that makes real time or near real time ray and path tracing a reality. Right now a growing number of video games are partially ray traced. They combine traditional rasterization-based rendering techniques with some ray-tracing effects. Rasterization is equivalent to casting one set of rays from a single point that stops at the first thing they hit. Ray tracing takes this further, casting rays from many points in any direction. And a technique known as path tracing can use ray tracing as one component of a larger light simulation system to simulate the true physics of light. See Kajiya, cited above. In one example of path tracing, all lights in a scene are sampled stochastically—using Monte Carlo or other techniques—both for direct illumination, to light objects or characters, and for global illumination, to light rooms or environments with indirect lighting. To do that, rather than tracing a ray back through one bounce, rays would be traced over multiple bounces (just as real light behaves), back to their light sources. The results are extremely realistic but the underlying ray tracing processes substantially increase the number of rays that need to be cast into the scene and tested for intersection with geometry in the scene—placing a premium on ever more efficient ray-geometry intersection testing.

Acceleration Structures (ASes)

A basic task for most ray tracers is to test a ray against all primitives (e.g., geometry such as polygons, or procedural primitives in some implementations) in the scene and report either the closest hit (according to distance measured along the ray) or simply the first (not necessarily closest) hit encountered, depending upon use case. The naïve algorithm would be an O(n) brute-force search. However, due to the large number of primitives in a 3D scene of arbitrary complexity and the ray path divergence mentioned above, it usually is not efficient or feasible for a ray tracer to test every geometric primitive in the scene for an intersection with each of a potentially very large number of rays. Some way to narrow the scope of the intersection testing was needed.

It was found that by pre-processing the scene geometry and building a suitable acceleration data structure (also known as an acceleration structure or AS) in advance, it became possible to reduce the average-case complexity to O(log n). Such ASes provide spatial or object hierarchies used by the ray tracing traversal algorithm to efficiently search for primitives that potentially intersect a given ray.

The AS most commonly used by modern ray tracers is a bounding volume hierarchy (BVH) comprising nested axis-aligned bounding boxes (AABBs). The leaf nodes of the BVH contain the geometric or other primitives (e.g., triangles) to be tested for intersection. The BVH is most often represented by a graph or tree structure data representation. AABB bounding volume hierarchies (BVHs) of the type commonly used for modern ray tracing acceleration data structures typically have an O(log n) search behavior—much better than the O(n) brute-force search.

The BVH acceleration data structure represents and/or references the 3D model of an object or a scene in a manner that will assist in quickly deciding which portion of the object a particular ray is likely to intersect and quickly rejecting large portions of the scene the ray will not intersect. The BVH data structure represents a scene or object with a bounding volume and subdivides the bounding volume into smaller and smaller bounding volumes terminating in leaf nodes containing geometric primitives. The bounding volumes are hierarchical, meaning that the topmost level encloses the level below it, that level encloses the next level below it, and so on. In one kind of BVH, leaf nodes can potentially overlap other leaf nodes.

FIGS. 1A-1C illustrate ray tracing intersection testing in the context of a BVH providing a bounding volume 310 that bounds geometric mesh 320. FIG. 1A shows a ray 302 in a virtual space including bounding volumes 310 and 315. To determine whether the ray 302 intersects geometry in the mesh 320, each geometric primitive (e.g., triangle) could be directly tested against the ray 302. But to accelerate the process (since the object could contain many thousands of geometric primitives), the ray 302 is first tested against the bounding volumes 310 and 315. If the ray 302 does not intersect a bounding volume, then it cannot intersect any geometry inside of the bounding volume and all geometry inside the bounding volume can be ignored for purposes of that ray. Because in FIG. 1A the ray 302 misses bounding volume 310, any geometry of mesh 320 within that bounding volume is not tested for intersection.

While bounding volume 315 is intersected by the ray 302, bounding volume 315 does not contain any geometry and so again, no further testing is required.

On the other hand, if a ray such as ray 304 shown in FIG. 1B is determined to intersect a bounding volume 310 that contains geometry, then the ray might or might not intersect the geometry inside of the bounding volume. Further tests need to be performed on the geometry itself to find possible intersections. Because the rays 304, 306 in FIGS. 1B and 1C, respectively intersect a bounding volume 310 that contains geometry, further tests need to be performed to determine whether any (and which) primitives inside of the bounding volumes are intersected by the rays.

In FIG. 1B, further testing of the intersections with the primitives would indicate that even though the ray 304 passes through the bounding volume 310, it does not intersect any of the geometry the bounding volume encloses (alternatively, as mentioned above, bounding volume 310 could be further volumetrically subdivided so that a bounding volume intersection test could be used to reveal that the ray does not intersect any geometry or more specifically which geometric primitives the ray may intersect). In the FIG. 1B case, further testing will reveal that ray 304 misses all the geometry 320 so that no interaction between the ray and the geometry will contribute to visualization—but the ray is also not occluded by the geometry and so can continue on its way to possibly impinge on additional geometry in the scene.

FIG. 1C shows a situation in which the ray intersects bounding volume 310 that contains geometry 320 which ray 306 intersects. To perform real time ray tracing, an intersection tester will generally test each geometric primitive within the intersected bounding volume 310 to determine whether the ray intersects that geometric primitive and/or which primitive is spatially the "first" one the ray intersects.

Instanced Ray Traversal

In 2010, NVIDIA took advantage of the high degree of parallelism of NVIDIA GPUs and other highly parallel architectures to develop the OptiX™ ray tracing engine. See Parker et al., "OptiX: A General Purpose Ray Tracing Engine" (ACM Transactions on Graphics, Vol. 29, No. 4, Article 66, July 2010); see https://developer.nvidia.com/rtx/ray-tracing/optix. In addition to improvements in APIs (application programming interfaces), one of the advances provided by OptiX™ was improving the ASes used for finding an intersection between a ray and the scene geometry. OptiX™ provides a number of different AS types that the application can choose from. Each AS in the node graph could be a different type, allowing combinations of high-quality static structures with dynamically updated ones.

One of the challenges of constructing ASes is to make them memory-efficient. OptiX™ therefore also provided for "instancing"—namely low-overhead replication of scene geometry by referencing the same data more than once, without having to copy heavyweight data structures. Nodes in the AS graph could be referenced multiple times, which naturally implemented instancing. It was considered desirable not only to share geometry information among instances, but also to share ASes as well.

To support such instancing, Microsoft DXR and other rendering specifications divide the AS into a two-level tree as shown in FIG. 2:

an instance AS (IAS), also known as a top-level acceleration structure (TLAS), contains a set of instanced references to . . . .
  geometry ASes (GASes), also known as a bottom-level acceleration structure (BLAS).

The BLAS contains geometric or procedural primitives. The BLAS thus holds the actual vertex data (i.e., geometry) of each object in the scene. The top-level AS (TLAS) defines bounding volumes that contain one or more bottom-level structures. For each BLAS, the top-level AS will define a bounding volume that contains the instances of the geometry the BLAS specifies, each one with its own transformation matrix between the object space coordinate system of the geometry and the world space coordinate system of the scene. As FIG. 2 illustrates, this allows geometry instancing and reuse by inserting the same GAS into the TLAS multiple times, each with different transformation matrices. See e.g., Sjoholm, "Best Practices: Using NVIDIA RTX Ray Tracing" (Aug. 10, 2020), https://developer.nvidia.com/blog/best-practices-using-nvidia-rtx-ray-tracing/; https://d eveloper.nvidia.com/rtx/raytracing/dxr/dx12-raytracing-tutorial-part-1; Wyman et al, "Introduction to DirectX Raytracing" In: Haines, E., Akenine-Möller, T. (eds) Ray Tracing Gems. Apress, Berkeley, CA. https://doi.org/10.1007/978-1-4842-4427-2_3 (2019).

Geometry replicated several or many times in the scene at different positions, orientations and scales can thus be represented in the scene as IAS instance nodes. These IAS instance nodes do not explicate geometry, but instead associate a bounding box and leaf node in the world space BVH with a transformation that can be applied to the world-space ray to transform it into an object coordinate space, and a pointer to an object-space GAS. The instance transform increases efficiency by transforming the ray into object space instead of requiring the geometry to be transformed into world (ray) space, and is also compatible with additional, conventional rasterization processes that graphics processing performs to visualize the primitives.

Instanced Ray Traversal Can Sometimes Lead to Reduced Performance

The use of instancing is extremely powerful for ray tracing applications. It saves memory and reduces computations. However, in certain circumstances, instancing can cause the ray tracer to expend many processing cycles needlessly.

As explained above, a bounding volume is often used to approximate the space an object occupies. If a more precise understanding beyond an approximation is required, the object itself is then inspected to determine what space it occupies. Often, a simple volume (such as an axis-aligned bounding box or AABB) is used as a bounding volume to approximate the space occupied by an object. But suppose a GAS contains geometry that when instanced in the TLAS results in disjoint sets of instanced geometry. Depending on the spatial relationship between the different instances, the AABB may need to be very large in order to contain all of the instances. That causes a lot of space that is not occupied by any geometry to be included in the AABB. When geometry does not fit well, there can be false hits that lead to extra work.

Consider for example ray tracing of the chair cushions (see crosshatched items in FIG. 3) spread out across many chairs in a café scene. These cushions are separately-occurring geometry, but a developer can choose to model all of the seat cushions within the same GAS to make uniform any surface treatments such as textures. As separate geometry, perhaps grouped spatially with the chair itself, the AS would instance the BLAS seat cushion geometry into the TLAS world space of the FIG. 3 café scene at 32 different desired positions/orientations/scalings scattered across the café scene.

By grouping all 32 chair cushions into a single GAS distinct from the chair and that is then instanced e.g., a single time by the TLAS, there is consistent information to go from that returned instance information to the appropriate shader for any chair cushion, which is an advantage and matches guidance given for presenting geometry in raster-based use cases. But a single AABB bounding volume used in the IAS will not efficiently fit those all of those 32 seat cushions because it will include not just the seat cushions but the space between them.

Think about constructing a single AABB bounding volume that encloses all 32 seat cushions scattered across the FIG. 3 café scene. The resulting IAS bounding volume for ray tracing would occupy a substantial part of the volume of the café scene. That can lead to many false positive traversals of the GAS for rays that don't get close to any seat cushion. In other words, despite the power of instancing to compress AS representations and efficiently provide common surface treatments for each of multiple instances, the AS would in this case not (or only marginally) increase efficiency of ray tracing over just testing each ray directly against each of the seat cushion geometries.

Thus, when a developer constructs a GAS for material or shader locality, there are often spatial gaps between the geometry—for example when a collection of instance-grouped geometry is scattered across the scene as in FIG. 3. Those gaps can cause false positive intersections in the IAS traversal. False positives lead to wasted transforms and traversals of the GAS which reduces ray tracing performance Similar false positives can be found with oddly shaped connected meshes which as well don't tightly fit within an AABB bounding volume.

Possible Solutions

Developers could be asked to split up GASes like these to provide better spatial locality for ray tracing, but that may incur cost elsewhere (e.g., in rasterization) and is dependent on the developer. The use of a common IAS node for 32 geometrically identical seat cushions might be more efficient for rasterization even though it will be very inefficient for ray tracing. It is still common for graphics applications to use a hybrid approach for visualization by rasterizing some of the visualization (e.g., the view as seen from a virtual camera) and using ray tracing to enhance the visualization (e.g., to draw shadows, reflections and ambient occlusions). Thus, developers commonly want to design ASes that offer efficiencies for both rasterization and ray tracing.

Irrespective of choices the developer makes, an automated BVH builder for ray tracing could break up a GAS into multiple independent GASes when detecting such cases. But remember that a huge advantage of instancing is to save memory by reusing BLAS geometry across multiple TLAS instances. Breaking up a GAS into multiple independent GASes introduces a memory cost that is not transparent to the developer. As well, that is a decision that needs to be made at GAS build time which ultimately also affects the size of the IAS—also something that is seen and managed by the developer.

Another Possible Solution: Multi-Box

To increase ray tracer efficiency, NVIDIA previously developed a solution called Multi-Box that allowed for IAS bounding volumes to be made of multiple AABBs instead of a single AABB. See U.S. Pat. No. 11,295,508. This solution constructs an AABB AS using compressed treelets ("complets") that are wide, allowing multiple (e.g., up to 12 in some embodiments) bounding volume children to be tested simultaneously—and then extends the complet concept with a Multi-Box complet format that allows a single child to have multiple bounding volumes (e.g., AABBs) associated with it, where a "hit" (positive result of a ray-bounding volume intersection test) on any positive number (one or more) of those bounding volumes is treated as a single "hit" or intersection for that child. In other words, the traditional ray-bounding volume intersection test is in appropriate cases (i.e., cases where bounding the geometry doesn't fit the AABB bounding volumes well) explicated to test (e.g., in parallel within a single cycle in some embodiments) a plurality of bounding volumes (all of which can be AABBs) instead of a single bounding volume. Those plurality of AABB bounding volumes can be positioned, sized and oriented to more closely enclose such geometry than any single AABB could. The plurality of bounding volumes (e.g., one bounding volume for each instance in one application) can have the same sizes and/or shapes and/or orientation or different sizes and/or shapes and/or orientations. They can be connected, overlapping or disjoint.

The disjoint Multi-Box solution would seem to a natural for the kind of instanced geometry shown in FIG. 3. In particular, it allows the BVH builder to "hoist" a limited number of AABBs from the GAS into the IAS for a tighter IAS bounding volume. In the seat cushion case of FIG. 3, for example, Multi-Box could define different AABB bounding volumes for each different seat cushion that are then tested for during TLAS traversal. But while the Multi-Box solution can greatly increase efficiency for instanced ray traversal in many applications, past commercial implementations have certain limitations when Multi-Box is used by itself, for example:

1. Independent of how many boxes in a Multi-Box grouping are hit by a ray, if at least one box is hit, the entire GAS may need to be traversed (this can result in inefficiencies for example if the GAS corresponds to spatially disparate instance-grouped geometry such as the FIG. 3 seat cushions).
2. Multi-Box in one prior implementation is restricted to a single complet (compressed treelet), so any hoisting of the GAS boxes into the IAS may need to reside in a single IAS complet.
3. Multi-Box in one prior implementation has an implementation-dependent maximum number of boxes that can be hoisted into the TLAS. For example, in one commercial hardware implementations, the limit is 12—the maximum number of children nodes within a complet. This limit provides for better culling before the transform, but may limit flexibility for ASes that could benefit from more instances. For example, the 32 seat cushion instance-grouped geometry shown in FIG. 3 could not easily be accommodated by a complet that accommodates 12 child nodes—and would probably require the BLAS to be restructured to reduce the number.
4. While Multi-Box can be propagated up a small distance into internal nodes within the IAS, the Multi-Box group is treated in some implementations as a single group and eventually will be a single box at some point. Thus, applying Multi-Box to the FIG. 3 scenario is still going to effectively result in a common TLAS graph or tree containing all of the instance-grouped geometry that must be traversed when a bounding volume for any of the enclosing bounding volumes tests positive for ray intersection.

Given the great potential of a truly interactive real time ray tracing graphics processing system for rendering high quality images of arbitrary complexity in response for example to user input, further work is possible and desirable. In particular, it would be highly desirable to further increase ray tracing efficiency and improve performance by providing a mechanism(s) that reduces or eliminates the above constraints.

BRIEF DESCRIPTION OF THE DRAWINGS

Prior Art

Prior Art

FIGS. 6A-6F show example data structures.

DETAILED DESCRIPTION OF NON-LIMITING EMBODIMENTS

The present technology enhances the conventional AS to define partial ASes such as subtrees within the AS for instanced ray traversal. In one embodiment, the enhancement allows an AS builder to delineate different IASes for a ray tracer to traverse for different instances of given GAS geometry. Thus, the AS can define a certain GAS geometric specification that is instanced into some possibly large number N of different instances of that GAS geometric specification in a scene, while delineating different scopes or subsets of nodes within the AS for a ray tracer to traverse in order to test for ray intersection for different instances.

An embodiment herein, which could be called "Alternate Root Complet" (ARC), enables dynamic IAS build time decisions to split any number of GASes in a manner that is developer transparent, nearly memory storage neutral, and traversal efficient. A primary use is for addressing situations like the chair cushion example of FIG. 3 to reduce the number of false positive IAS to GAS transitions.

Figure 3:
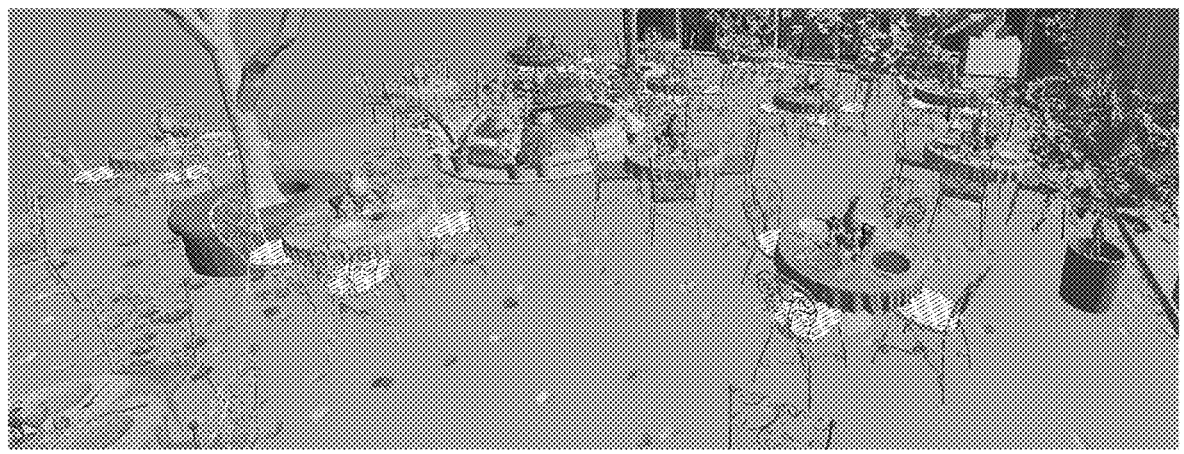
FIG. 3 shows an example scene with many spatially distributed occurrences of specified instance-grouped geometry.

Ideally, to delineate such scopes or subsets, once an intersection is found between a ray and a TLAS bounding volume, one would like to jump to a (any) selected intermediate level node in the BLAS. For example, in the case of the AS being a tree structure, one would like to be able to traverse the AS starting from an intermediate level of the tree to traverse for a given set of geometry such as a single seat cushion as shown in FIG. 3 as opposed to having to traverse a tree containing all of its instance-grouped geometry. However, past ray tracing traversal hardware implementations were not designed to do this.

In particular, one example implementation of ray tracing hardware ("TTU") described in greater detail below in connection with FIG. 12 has a stack management unit 740 that manages a stack for traversing the AS. While it is possible to use such stack management hardware to begin a downward traversal of the AS at any desired level of the tree, the stack in practical implementations can maintain only a limited amount of information on "where it has been" as the hardware traverses further down the AS levels. Different implementations can have different stack capacities, but no such stack has infinite capacity and ASes are becoming more and more complex, requiring further recursion levels for traversal.

If/when the stack overflows, the prior traversal hardware uses parent pointers to traverse back up the stack so that no part of the AS is overlooked. But like how the birds ate the breadcrumbs Hansel and Gretel dropped before Hansel and Gretel had a chance to use them to retrace their path out of the forest, it often happens that as downward traversal continues, the stack runs out of room and "overflows." When the stack overflows, a lost bit is set. When the stack is about to go empty and the lost bit is set, a complet traversal produces a continuation entry that points to the parent complet. Return traversal proceeds through a succession of child-to-parent pointers to go back up the AS tree until it hits the "root" complet—defined by a complet which has no valid parent pointer to traverse. If there are no further hits under the root complet, traversal is done.

Which means that if the hardware began a downward traversal of a selected subtree of the AS starting at a given node/level of the AS, the corresponding return or upward traversal to a "root node" would end up escaping a selected subtree defined by a starting node and instead upwardly traverse the entire tree to the root complet. Thus, in general using past hardware, intermediate (non-root) nodes could not be designated as root nodes for given instance or other traversals because traversal would need to stop there and not continue up to the remainder of the tree—but the hardware had no way of doing this. Rather, downward traversal that started at a subtree rooted by a non-root node was not guaranteed to be restricted to that sub-tree and could escape to still upward levels of the AS if the lost bit becomes set. What is needed is a way to constrain traversal by the hardware to a subtree of the AS.

The present technology solves this problem by providing a sort of overlay onto the AS—allowing the builder to selectively designate AS nodes as "alternate root complets" (ARCs). Just as use of nicknames do not interfere with taxes, voting and other procedures requiring full legal names, such additional ARC designations do not interfere with typical "full" traversal of the AS in the prior manner, but instead provide additional flexibility so that in selected circumstances, instanced ray traversal can be confined to a specified part or subtree of the AS.

The present technology thus eliminates or reduces limitations described above such as:
1. If at least one box is hit in a Multi-Box grouping, ARC only needs to traverse the sub-tree under the ARC instance corresponding to the box that was hit.
2. ARC instance nodes can be placed anywhere in the IAS.
3. ARC may divide an instance into any number of groups—thus overcoming a limitation as to how many instances a single complet can accommodate.
4. ARC can be independently grouped even to the root of the IAS.

In one embodiment, the primary mechanism of ARC is to add a programmable bit or other indicator per complet that allows the ray tracer traversal hardware to treat any complet as a root complet. This allows the traversal hardware to traverse just a sub-tree of the GAS (or IAS even). The disclosed mechanism thus provides a flexible way to divide an AS into parts such as subtrees for more efficiently traversing represented geometry for ray-intersection tests.

In one embodiment, a complet has both a pointer to a (the) parent complet as well as an index for itself within that parent complet. In other words, just like an ancestry chart, a child complet points to its parent complet, that parent's complet in turn points to its parent's compet (i.e., the child's grandparent complet), and so on. In one embodiment, the existing stack management unit 740 (see FIG. 12) hardware is modified to recognize a new indicator field in the complet that indicates "alternate root node". As mentioned above, prior hardware interpreted a complet as indicated to be a "root" if the index referred to above is set to a predetermined value that is an invalid index for a child complet. The new indicator field in contrast allows any complet—even one that has a parent complet—to be treated as a root for instanced ray traversal.

Alternate Root Complets Defining Subtree Traversals

In an embodiment herein, ARC allows an AS builder to define subtrees in an AS for traversal by TTU hardware by marking or otherwise designating complets as potential root complets or alternate root complets for subtrees—even though they are at intermediate levels of the AS tree and have a valid parent pointer. The builder is then free to use those alternate root complets (e.g., as if they were root complets) when setting up instances. In this way, the AS builder can define different TLAS root instance nodes for different instances or groups of instances of geometry ("instance-grouped geometry") such as the FIG. 3 seat cushions—using the instance nodes to define different subtrees that can be traversed individually without the hardware needing to traverse other BLAS instances.

As one example, the AS builder could mark or designate alternate root complets for each table set of four seat cushions in FIG. 3—and create corresponding AABB bounding volumes each encompassing only the cushions at a respective table in the café. This would substantially reduce the sizes of the bounding volume to be tested for intersection with the ray. In one embodiment, the Multi-Box approach discussed above can be used in combination with the ARC technique to provide more efficient, disjoint bounding volumes for each of the seat cushions at a given table in the café to further effectively improve the fit between seat cushions and bounding volumes for the ray-bounding volume test (TLAS) while reducing the amount of geometry tested for ray-geometry intersection (BLAS).

Build Time Decisions:

At IAS build time, the AS builder can choose whether to use a single instance node pointing to the root complet or to provide the ability to split up the instance-grouped geometry into multiple instance nodes pointing to alternate root complets. In one embodiment, adding such additional instance nodes does not require any changes to the BLAS but does require additional memory to store the additional TLAS instance nodes and to add them as leaves in the BVH. Having the choice at IAS time allows, as one example, the builder to proportion a specific amount of memory (e.g., no more than 50% more memory) and stay within that budget (this can translate into the builder determining how many alternate root complets to add to the AS). In contrast, at GAS build time it is not known how many instances of some object there may be in the final scene, so the memory expansion is not bounded if instance-grouped geometry were split using a non-ARC implementation.

The AS builder can use a variety of algorithms including but not limited to artificial intelligence/neural networks, heat maps, a spatial analysis of the instance-grouped geometry defined by the BLAS, etc. to decide whether to create any alternate root complets, how many alternate root complets to create, and which alternate root complets to create—thereby trading off memory usage costs against potential performance increases at runtime of the ray tracing traversal and testing hardware. Diagnostic tools that exercise the AS could in one embodiment be used to gather empirical test data to make or help make such decisions. In other embodiments or applications where memory usage and bandwidth are not so much of a concern, the AS builder could create alternate root complets (thereby spending memory allocation) and later processes (e.g., at runtime) could determine whether to use them instead of a "main" root complet and which alternate root complets to use (although once memory has been allocated for alternate root complets, there would likely be a preference to using them).

Figure 4A:
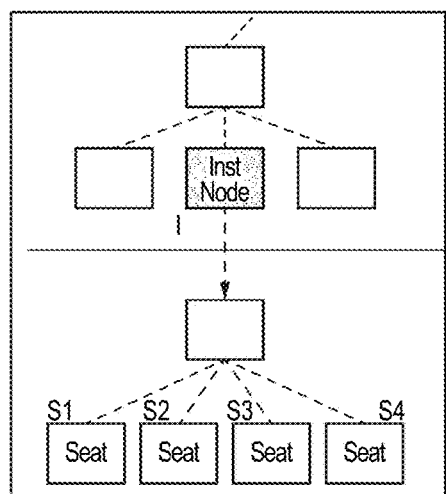
FIG. 4A shows an example prior art normal traversal of an acceleration structure with a single root node in the TLAS defining a subtree containing four occurrences of the seat cushion.
Figure 4B:
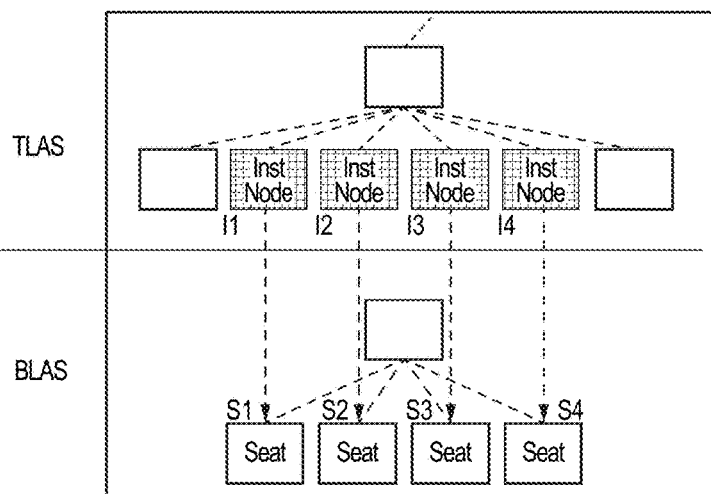
FIG. 4B illustrates the same acceleration structure as in FIG. 4A but this time with four alternate root complets in the TLAS each containing a respective instanced seat cushion.

FIGS. 4A, 4B shows a simplified version of what a subsection of the AS traversal structures might look like from the example in FIG. 3. FIG. 4A shows a potential legacy traversal structure with a single instance node I leading to the GAS comprising four seat cushions S1, S2, S3, S4. A ray tracer traversing this tree would need to test all four instanced seat cushions for ray-geometry intersection whenever the bounding volume intersection test revealed an intersection between the ray and the common bounding volume enclosing all four instanced seat cushions.

FIG. 4B shows how that tree could be crafted using ARC to create multiple IAS instance nodes I1, I2, I3, I4. By creating independent IAS instance nodes I1, . . . In, the bounding box or boxes of those multiple instance nodes can be around fewer seat cushions tighter—leading to fewer false positive intersections.

FIG. 4B shows four instance nodes I1, I2, I3, I4 pointing to four alternate-root complets at a depth of one in the bottom-level acceleration structure (BLAS), but any number of alternate-root complets can be specified. From the example in FIG. 3, each seat cushion could have its own instance node from a traversal perspective (i.e., cushion S1 is associated with IAS instance I1, cushion S2 is associated with IAS instance I2, and so on).

Any given AS can support any number of AS traversals structured as shown in FIG. 4A and any number of subtree traversals structured as shown in FIG. 4B.

Figure 5B:
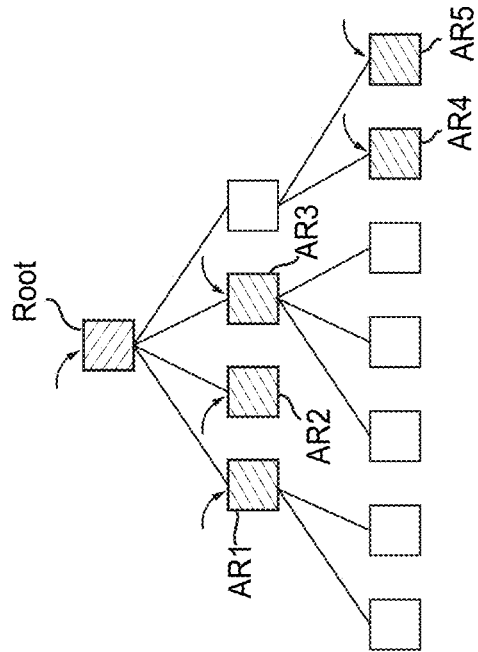
FIG. 5B shows the FIG. 5A example acceleration structure with opt-in/opt-out of BLAS splitting at TLAS build time.
Figure 5A:
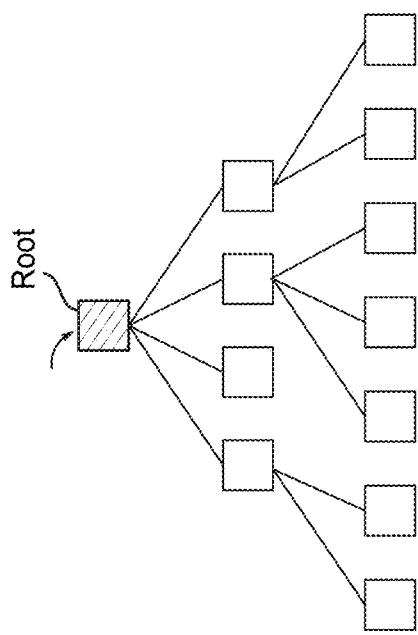
FIG. 5A shows an example prior art acceleration structure with a single BLAS root.

FIG. 5A again shows a prior art AS with a single BLAS root ("Root"). as contrasted with an enhanced AS of FIG. 5B that includes the original root ("Root") along with a number of alternate roots AR1, AR2, AR3, AR4, AR5 at different levels. The alternate roots AR split or divide the BLAS tree structure into subtrees so that traversal can start at and be contained within a subtree as opposed to involving the entire tree as would happen when traversing the FIG. 5A tree. Once the alternate roots AR are created in the AS, those alternate roots can be selectively observed/activated depending on the circumstances. In particular, the AS structured as shown in FIG. 5B can still be operated in one mode as a prior art AS with a single root, as shown in FIG. 5A, and the alternate roots properties of the AR nodes can be ignored or not observed. On the other hand, in other modes, one or more of the alternate roots AR can be used as root nodes for tree traversals, thereby containing the traversals within a subtree beneath the alternate roots so the traversal does not escape to the rest of the tree. It is thus possible using the FIG. 5B AS to opt in and opt out of any BLAS subtree shown at TLAS build time, for example—with the AS builder making a dynamic choice(s).

Designating AS Nodes as Alternate Roots

Figure 6A:
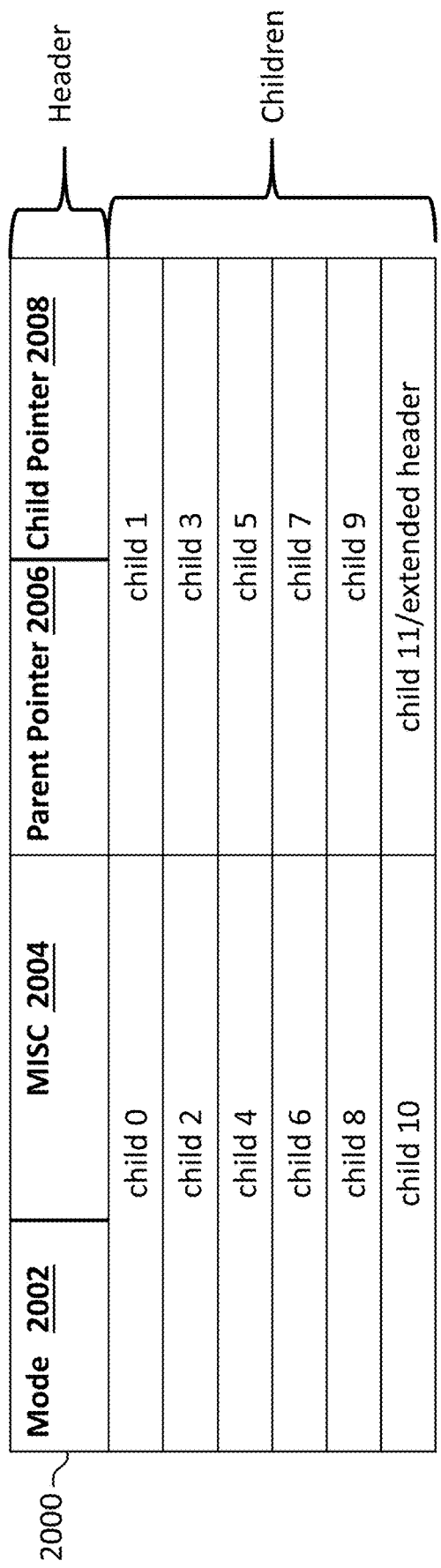
Figure 6B:
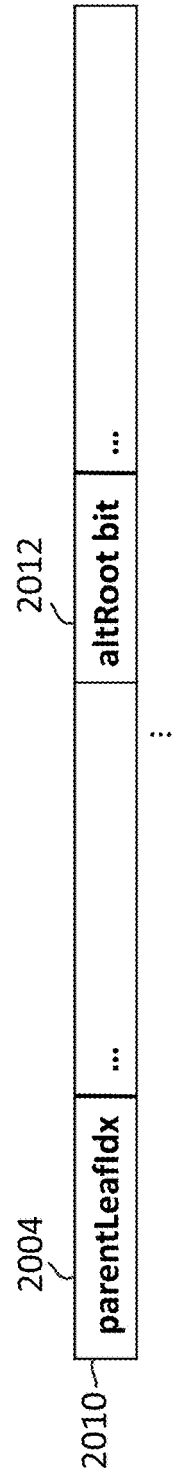

In one embodiment, the instance node adds an indicator (e.g., a bit or flag) that indicates the complet pointed to by the instance is an alternate root complet instead of a normal root complet. In one embodiment of a data structure representation of a complet as shown in FIG. 6A, the index is the 'parentLeafIdx' seen in FIG. 6B, which is part of the 'misc' field 2004 seen in the overall complet view in FIG. 6A. See the 'altRoot' bit 2012 in the extended header field in FIG. 6B—which when set indicates that even though the corresponding complet 2000 has a parent node (as pointed to by parent pointer 2006 shown in FIG. 6A) and is thus an intermediate node in a tree, it should be treated as a root node for the subtree it heads (as pointed to by the child pointer 2008 shown in FIG. 6A). The exact position, location and format/encoding of the indicator within the instance node is not important—the complexity of a header and extended header is in one embodiment an offshoot of previous design choices and could be simplified in other implementations.

FIGS. 6C and 6D show an example data format 2020 of an instance node in the TLAS. As usual, the instance node data format 2020 includes an ID, world space position information, and matrix values specifying the first three rows of world space to object space transformation matrix M in row-major order:

$$\begin{bmatrix} m00 & m01 & m02 & m03 \\ m10 & m11 & m12 & m13 \\ m20 & m21 & m22 & m23 \\ 0 & 0 & 0 & 1 \end{bmatrix}$$

In the example shown, the "format" bit or field 2024 specifies an extended header, and the extended header (shown in FIG. 6D) in turn includes an "altRoot" indicator 2022 that, when set, specifies that the instance uses an alternate root complet.

After an instance transform, the alternate root complet start indicator 2022 from the instance node data format 2020 is stored in an "A" field 2032 of a meta data field 2030 for the stack. See the "meta" field 2030 in FIG. 6E (exact position is not important) which includes an "A" bit 2032 that indicates whether or not the associated stack entry uses an alternate root complet. Note also the "L" bit 2034 in the same meta field 2030 shown in FIG. 6E, which indicates whether the stack had overflow (as mentioned above) or—as enhanced—whether traversal was started from a complet child (this indicates that traversal must backtrack to root before finally terminating) or no stack overflow has occurred (traversal can terminate when the stack becomes empty). In example embodiments, the A indicator is passed along for all complet intersections that might require a parent continuation. If a parent continuation is needed and both the alternate root complet start bit in the stack meta data 2030 and the complet's alternate root complet bit 2012 are set, then the traversal does not produce the parent continuation. Rather it treats the complet as if it were a root complet.

Additionally, in one embodiment in the case of stack returns and restores, that alternate root indicator as part of the meta data 2030 is passed back-and-forth to the streaming multiprocessor (a processor supervising the hardware based ray tracing operations in one embodiment) in the StackRestore destinations.

In one embodiment, the marking of alternate root complets as described above is done by the BVH builder at GAS construction time. Any complet may be a potential alternate root with the restriction in one embodiment that only one such complet can exist along any path from the (true) root complet to a leaf. If that restriction were violated, then it would not be possible to know with a single bit A indicator in the stack meta data 2030 which complet were to act as the root.

Another embodiment providing a stack meta indicator 2030 comprising more than a single bit can remove that restriction. With multiple bits, a value can be matched to a tag or mask in the complet to indicate which potential alternate root complet in a chain should act as the root complet. For example, a 2-bit field could distinguish between four different alternate root complets and associated subtrees. With less constraints on the number of bits, this could be simply the address of the complet which can be compared to generate the alternate root complet start on demand—which makes the AS tree randomly addressable such that a selected subtree can start at any level of the tree. More bits simply cost more area to store, so if the restriction above is workable, it may be preferred.

To assist with stack initialization starting traversal at an alternate root complet, an alternate root complet "a" field 2036 is added to the stack initialization fields as seen in FIG. 6F. The exact location, length and encoding of the field is not important. When that field is set to indicate "alternate root complet", the stack meta data 2030 is initialized as an alternate root complet start. Note that this same stack initialization is able to start a given traversal at any specified level of the AS, i.e., mid tree. Thus, using the technology herein, a given stack traversal can be specified to start at an alternate root complet and traversal can be confined to stay within the subtree "beneath" the alternate root complet in the tree structure.

It should be noted that the above-described data structures employ implicit pointers to save area in the hardware implementation, but those skilled in the art will understand that if using additional area were not a concern, explicit rather than implicit pointers could be used instead.

Fully Connected Meshes

Figure 16:
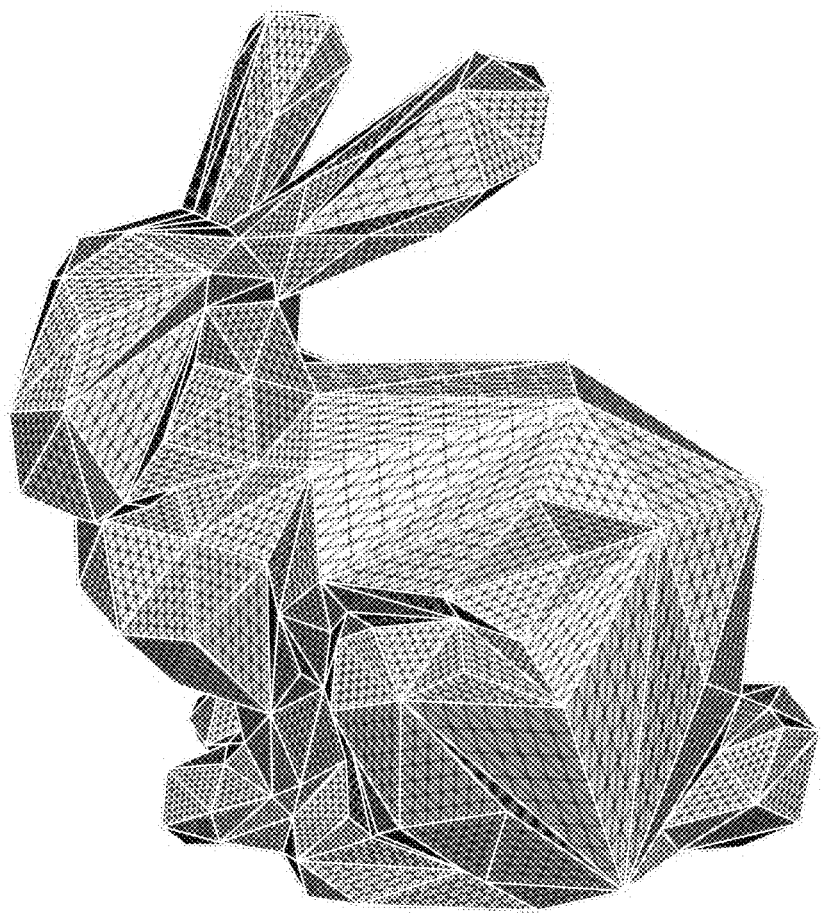
FIG. 16 shows an example of a fully connected mesh.

While the technology herein can be used to split any instance-grouped geometry, care should be taken when dealing with fully connected meshes such as shown in FIG. 16. Splitting of non-connected or distributed geometry like the seat cushions of FIG. 3 is safe since any individual part can be bound independent of the others. A problem with connected meshes is that the DXR specification doesn't guarantee watertightness across an instance transform—so it is possible that a hit might occur slightly outside of the bounding box of an instance (the technology herein allows the TLAS bounding volumes to be smaller and thus more efficient). If that happens with an ARC-split, then it is possible for that hit in one portion of the instance to mask a bounding box intersection of a potentially closer hit in another part of the instance. The closer hit would have been found if the entire instance were traversed but is not when doing partial traversals. This is a corner case situation but can occur. If there is a concern, the builder can be designed to increase the sizes of bounding volumes that bound connected meshes to reduce the chance of cracks in the visualization.

Example Non-Limiting Implementation

The following provides more detail on how to construct BVH acceleration structures that supports/provides the technology herein and can be encoded using wide complet formats. Following that, an overall hardware based real time graphics processing system including real time ray tracing hardware that can traverse and manipulate such acceleration structures is disclosed.

Building A Bounding Volume Hierarchy

As described above, an acceleration data structure comprises a hierarchy of bounding volumes (bounding volume hierarchy or BVH) that recursively encapsulates smaller and smaller bounding volume subdivisions. The largest volumetric bounding volume may be termed a "root node." The smallest subdivisions of such hierarchy of bounding volumes ("leaf nodes") contain items—either directly or through instancing. And as mentioned above, in example implementations, intermediate bounding volumes can be designated alternate root nodes or alternate root complets in example embodiments.

The items in the leaf nodes could be primitives (e.g., polygons such as triangles) that define surfaces of the object. Or, an item could be a sphere that contains a whole new level of the world that exists as an item because it has not been added to the BVH (think of the collar charm on the cat from "Men in Black" which contained an entire miniature galaxy inside of it). If the item comprises primitives, the traversal co-processor upon reaching an intersecting leaf node tests rays against the primitives associated with the leaf node to determine which object surfaces the rays intersect and which object surfaces are visible along the ray.

Figure 7:
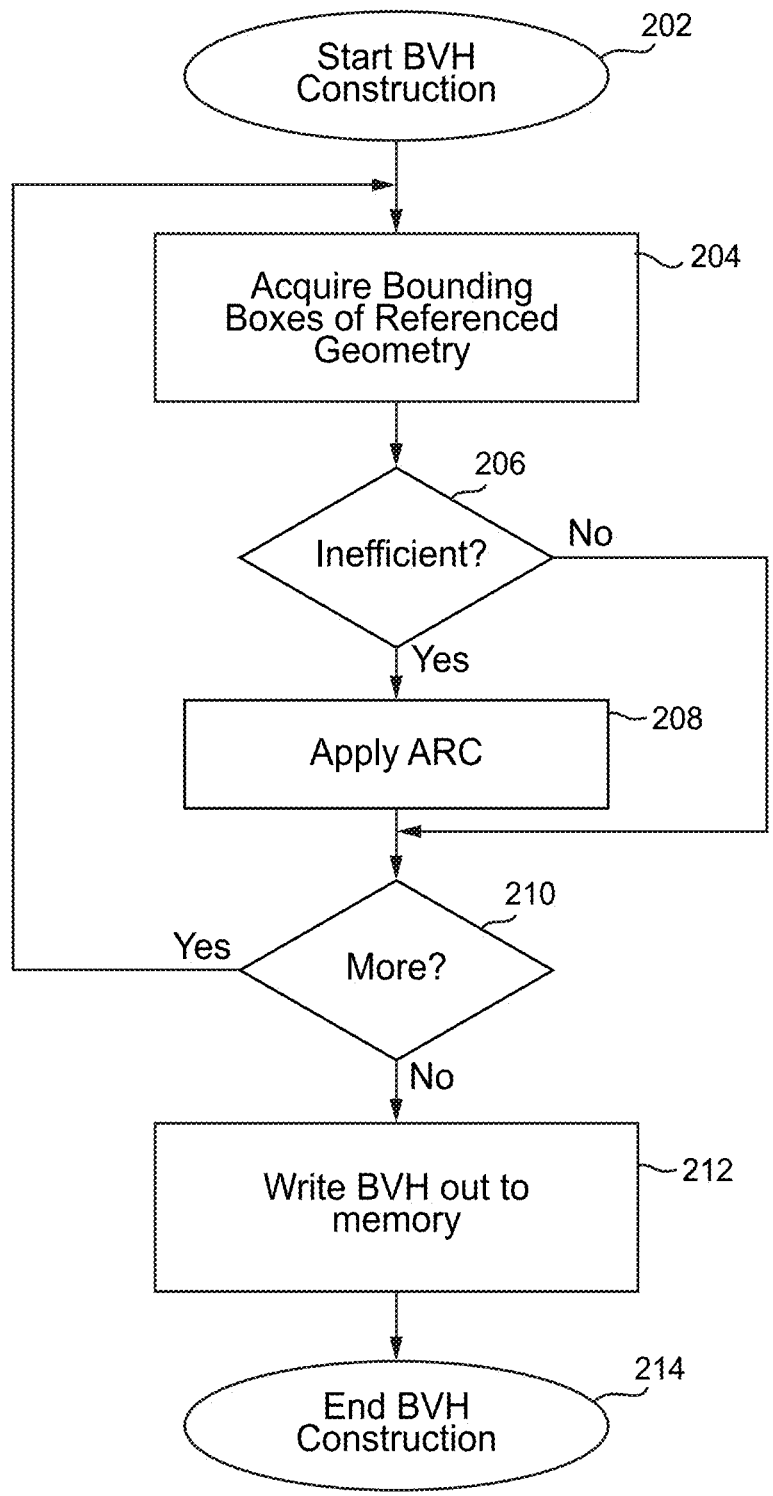
FIG. 7 is a flowchart of an example non-limiting acceleration structure build process.

Building a BVH can occur in two parts: static and dynamic. In many applications, a complex scene is preprocessed and the BVH is created based on static geometry of the scene. Then, using interactive graphics generation including dynamically created and manipulated moving objects, another part of the BVH (i.e., some or all of the BLAS or an additional, linked BVH(es) can be built in real time (e.g., in each frame) by driver or other software running on the real time interactive graphics system. BVH construction need not be hardware accelerated (although it may be in some non-limiting embodiments) but may implemented using highly-optimized software routines running on SMs 132 and/or CPU 120 and/or other development systems e.g., during development of an application. Thus, BVH construction may be accelerated by running it on one or more GPUs. FIG. 7 shows a BVH construction process, which may be specified by a set of instructions stored in non-transitory memory and executed by a processor such as a CPU and/or a GPU.

The first stage (FIG. 7, block 202) in BVH acceleration structure construction acquires the bounding boxes of the referenced geometry (FIG. 7, 204). This is achieved by executing for each geometric primitive in an object a bounding box procedure that returns a conservative axis-aligned bounding box (AABB) for its input primitive. Aligning bounding boxes with the axes of the relevant coordinate systems for the geometry provides for increased efficiency of real time geometrical operations such as intersection testing and coordinate transforms as compared for example to oriented bounding boxes (OBB's), bounding spheres, or other approaches. However, those skilled in the art will understand that the example non-limiting approaches and associated wide complet representations described herein can also be applied to more expensive bounding constructs such as OBBs, bounding spheres and other bounding volume technology. On the other hand, depending on the shape of the underlying geometry, using AABB bounding volumes may provide efficiencies.

Already subdivided bounding volumes that do include at least one portion of the geometry in a scene can be still further recursively subdivided—like the emergence of each of a succession of littler and littler cats from the hats of Dr. Seuss's' The Cat. In The Hat Comes Back (1958). The number and configurations of recursive subdivisions will depend on the complexity and configuration of the 3D object being modeled as well as other factors such as desired resolution, distance of the object from the viewpoint, etc. One example subdivision scheme is a so-called 8-ary subdivision or "octree" in which each volume is subdivided into eight smaller volumes of uniform size, but many other spatial hierarchies and subdivision schemes are known such as a binary tree, a four-ary tree, a k-d tree, a binary space partitioning (BSP) tree, and a bounding volume hierarchy (BVH) tree. See e.g., U.S. Pat. No. 9,582,607.

At some level of subdivision (which can be different levels for different parts of the BVH), the BVH construction process encounters geometry making up the encapsulated object being modeled. Using the analogy of a tree, the successive volumetric subdivisions are the trunk, branches, boughs and twigs, and the geometric is finally revealed at the very tips of the tree, namely the leaves. At this point, the BVH construction process also decides or is instructed on instancing to avoid duplicate or redundant geometric specifications in the acceleration structure, thereby conserving memory space and associated memory bandwidth. However, in one embodiment, based on the number of instances, the BVH construction process can apply alternate root complet technology as discussed above to arrange in advance for partial traversal of the BVH for one or a subset of instances of a particular geometry specification instead of requiring traversal of an entire tree that includes instances of that particular geometry specification. (FIG. 7, 206, 208). In so doing, the builder will redefine the bounding volumes in the TLAS so that, for example, instead of constructing a bounding volume to encompass all of the seat cushions in FIG. 3, the builder will define smaller bounding volumes containing fewer, spatially closer instances corresponding to ARC subtree traversals. The developer would not necessarily expect or care that the BLAS they specified would result in huge bounding volumes in the TLAS but they will appreciate the builder automatically optimizing the TLAS despite their decisions concerning the BLAS—just as a human programmer will appreciate increased coding efficiency an optimizing compiler automatically provides.

In one embodiment, this decision does not require the AS builder to reconstruct or significantly alter which geometry is in the BLAS (usually specified by the developer)—rather, the geometric or procedural primitives the BLAS specifies can remain unchanged, and all that is changed is to select between the traversal modes shown in FIGS. 4A/5A and 4B/5B (as well as where the alternate root complet that will be used to start and contain traversal of a subtree is to be placed within the AS). As discussed above, an alternate root complet can serve as the root for a single instance or for multiple instances, with the builder deciding based on rules, test projection of the BLAS hardware to determine if there are large spatial gaps, empirical analysis, artificial intelligence, prediction, test traversals such a heat maps, etc., how to structure AS roots and associated traversal subtrees most efficiently. The builder does not need to alter the fundamental structure of the BLAS in terms of what geometry it contains and how it is instanced into the TLAS—the traditional separation developers expect between specifying the BLAS and constructing the TLAS is maintained, with the builder automatically compensating for possibly inefficient instancing decisions made by the developer in specifying the BLAS by providing alternate AS traversal topologies without violating developer expectations that the BLAS they specified will be used instead of broken up and that the instance pointers from the BLAS into the constructed TLAS will also be preserved. In the best case, the enhancements the builder makes to the AS to incorporate the present technology is transparent to the developer and does not add significant memory cost while providing potentially significant performance increases by the AS traversal hardware at run time. The builder essentially is creating alternate, more efficient IASes on behalf of the developer without using significant additional memory or changing how the developer specified the geometry was to be included in the BLAS.

This process continues until all bounding volumes containing geometry have been sufficiently subdivided to provide a reasonable number of geometric primitives per bounding box (FIG. 7, 210). The real time ray tracer that uses the BVH will determine ray-primitive intersections by comparing the spatial xyz coordinates of the vertices of each primitive with the xyz coordinates of the ray to determine whether the ray and the surface the primitive defines occupy the same space. The ray-primitive intersection test can be computationally intensive because there may be many triangles to test. In many cases, it may be more efficient to further volumetrically subdivide and thereby limit the number of primitives in any "leaf node" to something like 16 or fewer.

The resulting compressed tree comprising compressed treelets or "complets" is written out into a data structure in memory for later use by the graphics processing hardware/ software during e.g., real time graphics processing that includes real time ray tracing (FIG. 7, 212, 214).

Figure 8A:
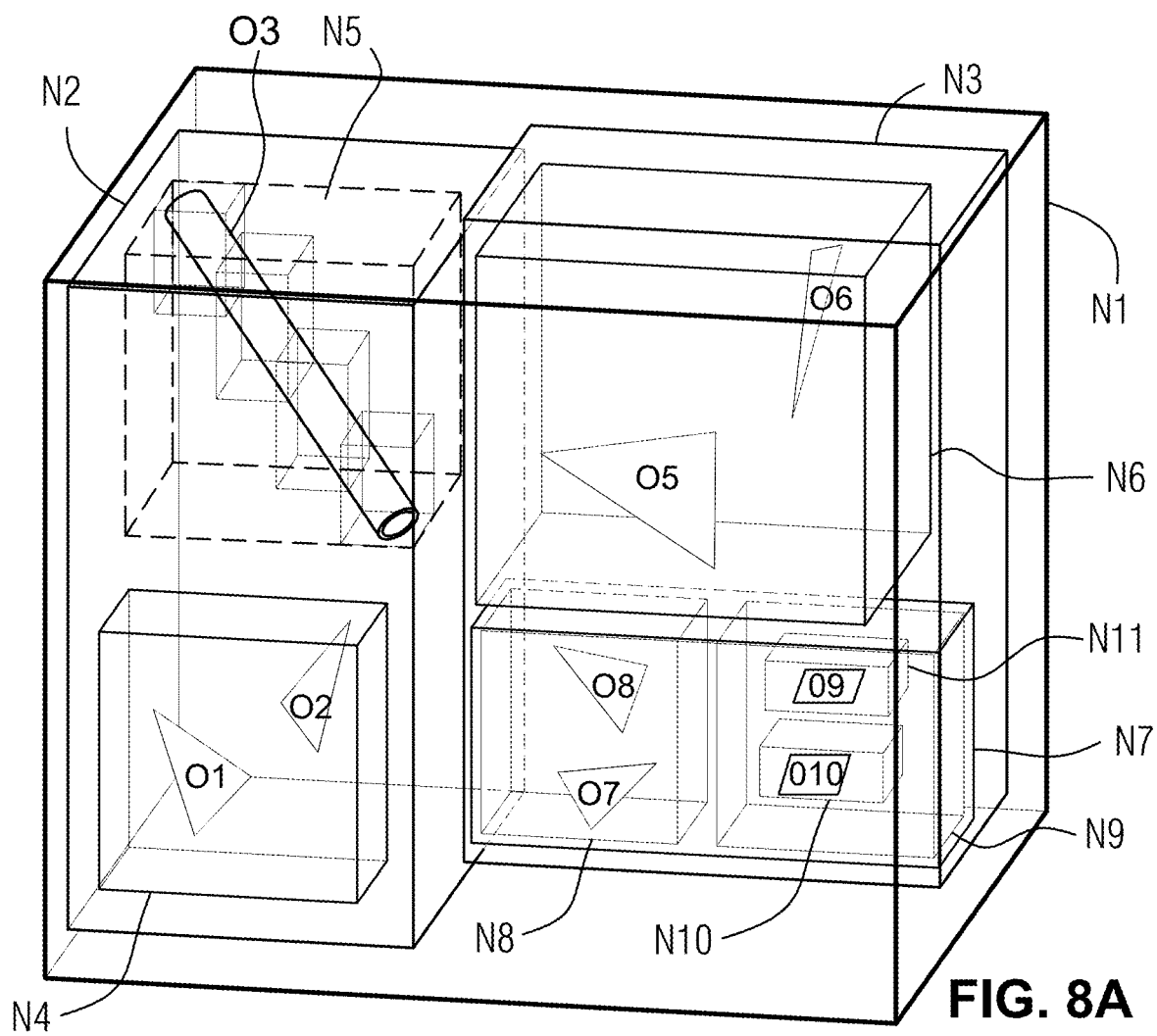
FIGS. 8A and 8B show example bounding volume hierarchy representations.
Figure 8B:
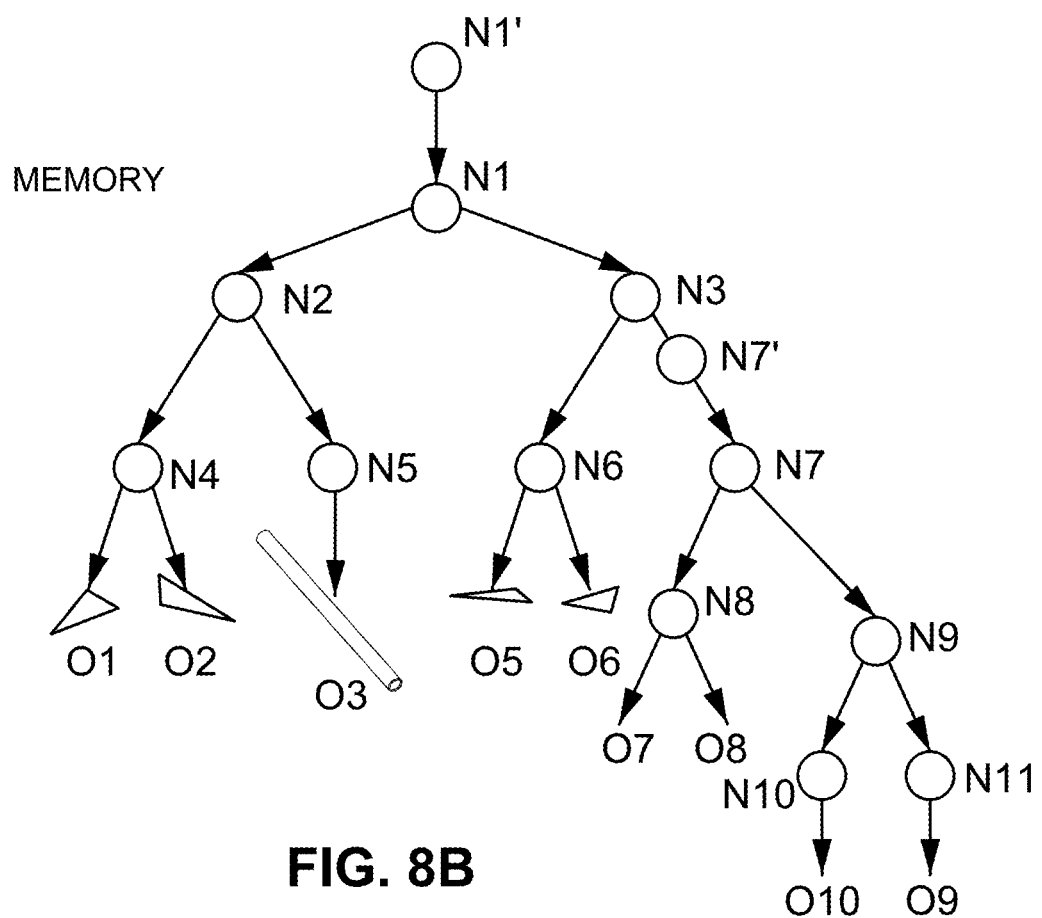

FIGS. 8A and 8B show a recursively-subdivided bounding volume of a 3D scene (FIG. 8A) and a corresponding tree data structure (FIG. 8B) that may be accessed by the ray tracer and used for hardware-accelerated operations. The tree data structure may be stored in memory and retrieved on demand based on queries.

The division of the bounding volumes may be represented in a hierarchical tree data structure with the large bounding volume represented by a parent node of the tree and the smaller bounding volumes represented by children nodes of the tree that are contained by the parent node. The smallest bounding volumes are represented as leaf nodes in the tree and identify one or more geometric primitives contained within these smallest bounding volumes.

The tree data structure includes a plurality of nodes arranged in a hierarchy. The root nodes N1 of the tree structure correspond to bounding volume N1 enclosing all of the primitives O1-O8. The root node N1 may identify the vertices of the bounding volume N1 and children nodes of the root node.

In FIG. 8A, bounding volume N1 is subdivided into bounding volumes N2 and N3. Children nodes N2 and N3 of the tree structure of FIG. 8B correspond to and represent the bounding volumes N2 and N3 shown in FIG. 8A. The children nodes N2 and N3 in the tree data structure identify the vertices of respective bounding volumes N2 and N3 in space. Each of the bounding volumes N2 and N3 is further subdivided in this particular example. Bounding volume N2 is subdivided into contained bounding volumes N4 and N5. Bounding volume N3 is subdivided into contained bounding volumes N6 and N7. Bounding volume N7 include two bounding volumes N8 and N9. Bounding volume N8 includes the triangles O7 and O8, and bounding volume N9 includes leaf bounding volumes N10 and N11 as its child bounding volumes. Leaf bounding volume N10 includes a primitive range (e.g., triangle range) O10 and leaf bounding volume N11 includes an item range O9. Respective children nodes N4, N5, N6, N8, N10 and N11 of the FIG. 7B tree structure correspond to and represent the FIG. 8A bounding volumes N4, N5, N6, N8, N10 and N11 in space.

Figure 2:
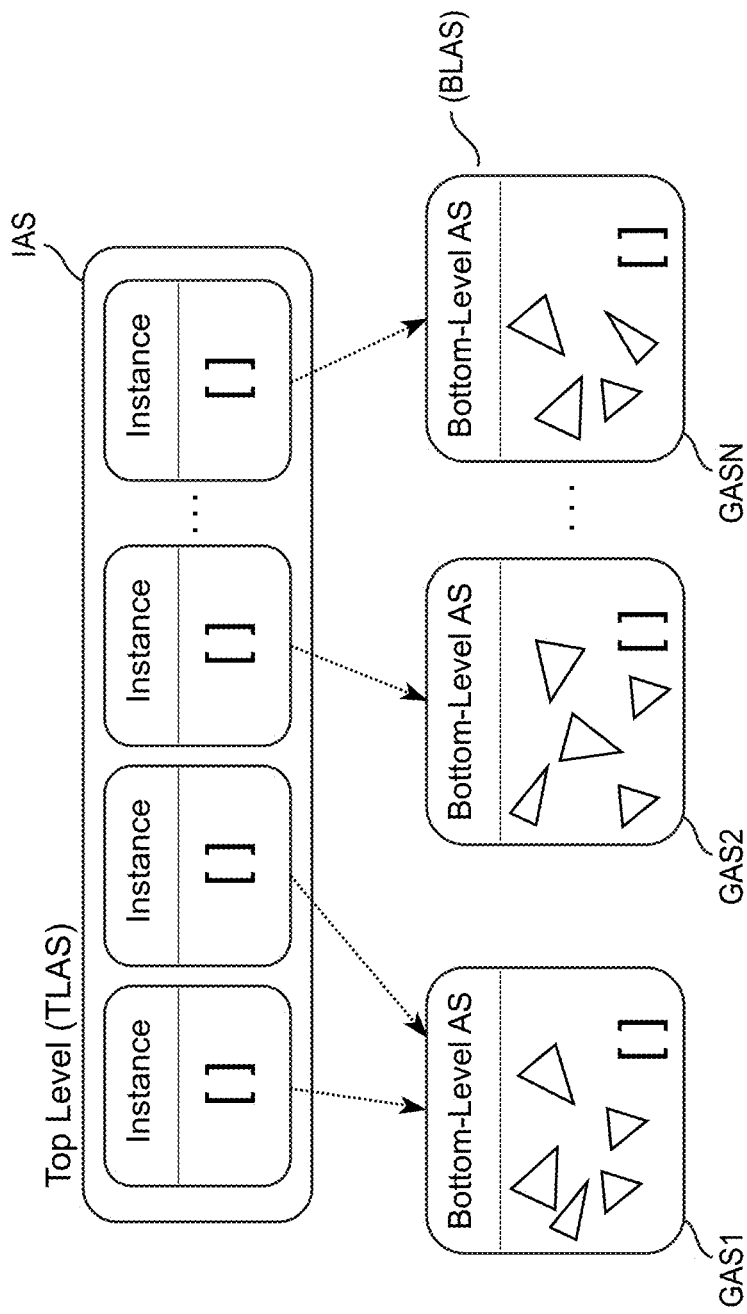
FIG. 2 shows an example instanced acceleration structure.

The FIG. 8B tree in this particular example is only three to six levels deep so that volumes N4, N5, N6, N8, N10 and N11 constitute "leaf nodes"—that is, nodes in the tree that have no child nodes. FIG. 8A shows that leaf node bounding volumes N4, N6, and N8 each contains two triangles of the geometry in the scene. For example, volumetric subdivision N4 contains triangles O1 & O2; volumetric subdivision N6 contains trials O5 & O6; and volumetric subdivision N8 contains triangles O7 & O8. FIG. 8A further shows that leaf node bounding volume N5 contains a single cylinder O3 such as shown in FIG. 2A that does not provide a good fit for the AABB bounding volume N5 shown in dotted lines. Accordingly, in an example non-limiting embodiment that uses Multi-Box described above, instead of using the larger AABB bounding volume N5 for the ray-bounding volume intersection test, TTU 138 instead tests the ray against a plurality of smaller AABB bounding volumes that are arranged, positioned, dimensioned and oriented to more closely fit cylinder O3.

The tree structure shown in FIG. 8B represents these leaf nodes N4, N5, N6, and N7 by associating them with the appropriate ones of primitive O1-O8 of the scene geometry. To access this scene geometry, the TTU 138 traverses the tree data structure of FIG. 8B down to the leaf nodes. In general, different parts of the tree can and will have different depths and contain different numbers of primitives. Leaf nodes associated with volumetric subdivisions that contain no geometry need not be explicitly represented in the tree data structure (i.e., the tree is "trimmed").

According to some embodiments, the subtree rooted at N7 may represent a set of bounding volumes or BVH that is defined in a different coordinate space than the bounding volumes corresponding to nodes N1-N3. When bounding volume N7 is in a different coordinate space from its parent bounding volume N3, an instance node N7' which provides the ray transformation necessary to traverse the subtree rooted at N7, may connect the rest of the tree to the subtree rooted at N7. Instance node N7' connects the bounding volume or BVH corresponding to nodes N1-N3, with the bounding volumes or BVH corresponding to nodes N7 etc. by defining the transformation from the coordinate space of N1-N3 (e.g., world space) to the coordinate space of N7 etc. (e.g., object space). As described herein, some implementations can "hoist" bounding volumes from the (object)

coordinate space of N7 to the (world) coordinate space of N1-N3 in order to in some cases avoid the need for performing such transforms.

Example Real Time Ray Tracing Hardware Accelerated Implementation

The acceleration structure constructed as described above can be used to advantage by software based graphics pipeline processes running on a conventional general purpose computer. However, the presently disclosed non-limiting embodiments advantageously implement the above-described techniques in the context of a hardware-based graphics processing unit including a high performance processors such as one or more streaming multiprocessors ("SMs") and one or more traversal co-processors or "tree traversal units" ("TTUs")—subunits of one or a group of streaming multiprocessor SMs of a 3D graphics processing pipeline, that is capable of providing complet intersection tests on ASes as described herein. The following describes the overall structure and operation of such as system including a TTU 138 that accelerates certain processes supporting interactive ray tracing including ray-bounding volume intersection tests, ray-primitive intersection tests and ray "instance" transforms for real time ray tracing and other applications. See e.g., U.S. Pat. Nos. 11,328,472; 11,302,056; 11,295,508; 11,282,261; 11,200,725; 11,189,075; 11,164,360; 11,157,414; 11,138,009; 11,113,790; 10,885,698; 10,867,429; 10,866,990; 10,825,232; 10,825,230; 10,810,785; 10,740,952; 10,580,196; 10,242,485; 10,235,338; 10,032,289; 10,025,879; 9,582,607; 9,569,559; US20160070820; US20160070767; https://www.nvidia.com/en-us/geforce/rtx/.

Example System Block Diagram

Figure 9:
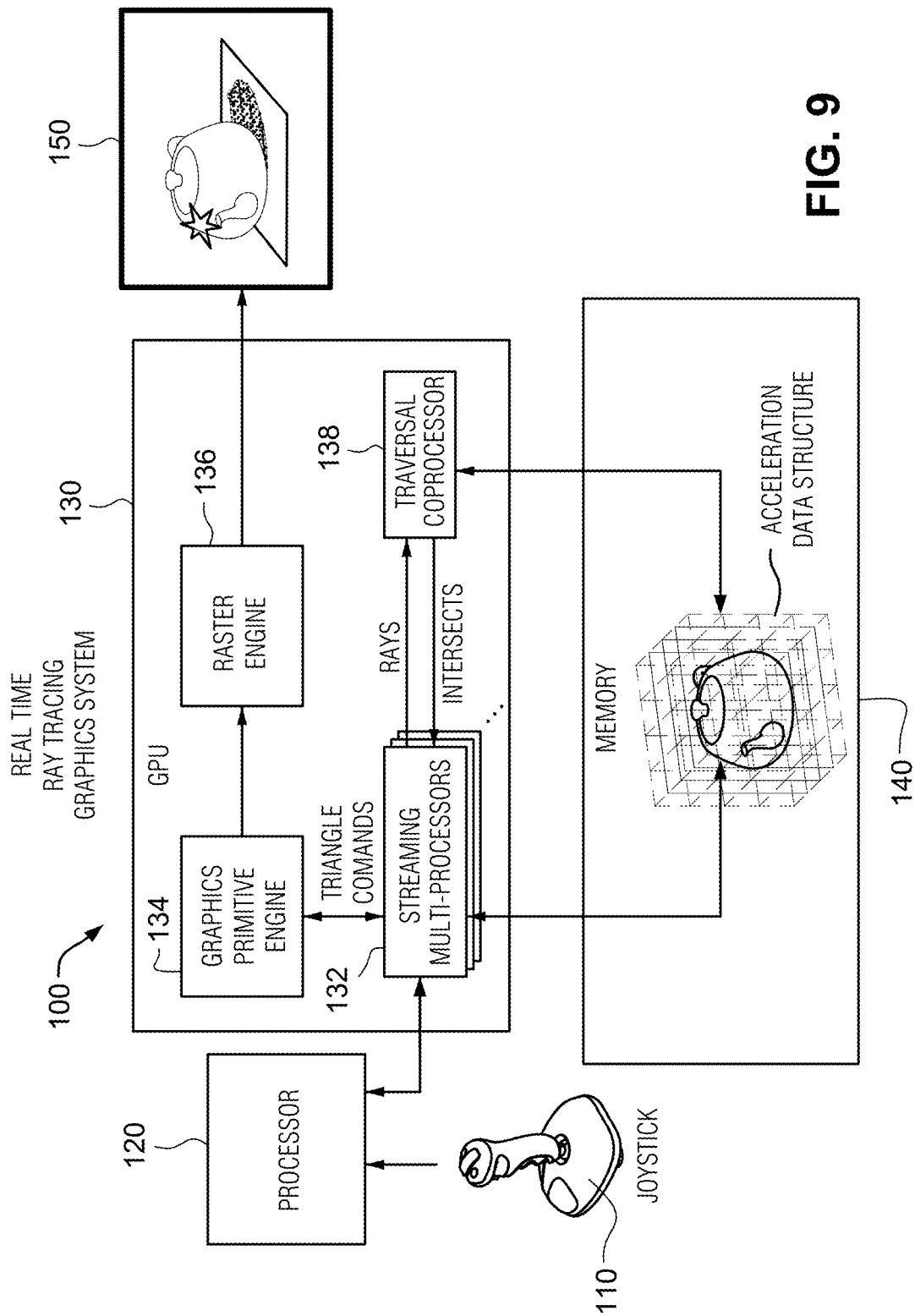
FIG. 9 illustrates an example non-limiting ray tracing graphics system.

FIG. 9 illustrates an example real time ray interactive tracing graphics system 100 for generating images using three dimensional (3D) data of a scene or object(s) including the acceleration data structure constructed as described above.

System 100 includes an input device 110, a processor(s) 120, a graphics processing unit(s) (GPU(s)) 130, memory 140, and a display(s) 150. The system shown in FIG. 9 can take on any form factor including but not limited to a personal computer, a smart phone or other smart device, a video game system, a wearable virtual or augmented reality system, a cloud-based computing system, a vehicle-mounted graphics system, a system-on-a-chip (SoC), etc.

The processor 120 may be a multicore central processing unit (CPU) operable to execute an application in real time interactive response to input device 110, the output of which includes images for display on display 150. Display 150 may be any kind of display such as a stationary display, a head mounted display such as display glasses or goggles, other types of wearable displays, a handheld display, a vehicle mounted display, etc. For example, the processor 120 may execute an application based on inputs received from the input device 110 (e.g., a joystick, an inertial sensor, an ambient light sensor, etc.) and instruct the GPU 130 to generate images showing application progress for display on the display 150.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Furthermore, images generated applying one or more of the techniques disclosed herein may be used to train, test, or certify deep neural networks (DNNs) used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Based on execution of the application on processor 120, the processor may issue instructions for the GPU 130 to generate images using 3D data stored in memory 140. The GPU 130 includes specialized hardware for accelerating the generation of images in real time. For example, the GPU 130 is able to process information for thousands or millions of graphics primitives (polygons) in real time due to the GPU's ability to perform repetitive and highly-parallel specialized computing tasks such as polygon scan conversion much faster than conventional software-driven CPUs. For example, unlike the processor 120, which may have multiple cores with lots of cache memory that can handle a few software threads at a time, the GPU 130 may include hundreds or thousands of processing cores or "streaming multiprocessors" (SMs) 132 running in parallel.

In one example embodiment, the GPU 130 includes a plurality of programmable high performance processors that can be referred to as "streaming multiprocessors" ("SMs") 132, and a hardware-based graphics pipeline including a graphics primitive engine 134 and a raster engine 136. These components of the GPU 130 are configured to perform real-time image rendering using a technique called "scan conversion rasterization" to display three-dimensional scenes on a two-dimensional display 150. In rasterization, geometric building blocks (e.g., points, lines, triangles, quads, meshes, etc.) of a 3D scene are mapped to pixels of the display (often via a frame buffer memory).

The GPU 130 converts the geometric building blocks (i.e., polygon primitives such as triangles) of the 3D model into pixels of the 2D image and assigns an initial color value for each pixel. The graphics pipeline may apply shading, transparency, texture and/or color effects to portions of the image by defining or adjusting the color values of the pixels. The final pixel values may be anti-aliased, filtered and provided to the display 150 for display. Many software and hardware advances over the years have improved subjective image quality using rasterization techniques at frame rates needed for real-time graphics (i.e., 30 to 60 frames per second) at high display resolutions such as 4096×2160 pixels or more on one or multiple displays 150.

To enable the GPU 130 to perform ray tracing in real time in an efficient manner, the GPU provides one or more "TTUs" 138 coupled to one or more SMs 132. The TTU 138 includes hardware components configured to perform (or accelerate) operations commonly utilized in ray tracing algorithms A goal of the TTU 138 is to accelerate operations used in ray tracing to such an extent that it brings the power of ray tracing to real-time graphics application (e.g., games), enabling high-quality shadows, reflections, and global illumination. Results produced by the TTU 138 may be used together with or as an alternative to other graphics related operations performed in the GPU 130.

More specifically, SMs 132 and the TTU 138 may cooperate to cast rays into a 3D model and determine whether and where that ray intersects the model's geometry. Ray tracing directly simulates light traveling through a virtual environment or scene. The results of the ray intersections together with surface texture, viewing direction, and/or lighting conditions are used to determine pixel color values. Ray tracing performed by SMs 132 working with TTU 138 allows for computer-generated images to capture shadows, reflections, and refractions in ways that can be indistinguishable from photographs or video of the real world. Since ray tracing techniques are even more computationally intensive than rasterization due in part to the large number of rays that need to be traced, the TTU 138 is capable of accelerating in hardware certain of the more computationally-intensive aspects of that process.

Given a BVH constructed as described above, the TTU 138 performs a tree search where each node in the tree visited by the ray has a bounding volume for each descendent branch or leaf, and the ray only visits the descendent branches or leaves whose corresponding bound volume it intersects. In this way, TTU 138 explicitly tests only a small number of primitives for intersection, namely those that reside in leaf nodes intersected by the ray. In the example non-limiting embodiments, the TTU 138 accelerates both tree traversal (including the ray-volume tests) and ray-primitive tests. As part of traversal, it can also handle at least one level of instance transforms, transforming a ray from world-space coordinates into the coordinate system of an instanced mesh. In the example non-limiting embodiments, the TTU 138 does all of this in MIMD fashion, meaning that rays are handled independently once inside the TTU.

In the example non-limiting embodiments, the TTU 138 operates as a servant (coprocessor) to the SMs (streaming multiprocessors) 132. In other words, the TTU 138 in example non-limiting embodiments does not operate independently, but instead follows the commands of the SMs 132 to perform certain computationally-intensive ray tracing related tasks much more efficiently than the SMs 132 could perform themselves. In other embodiments or architectures, the TTU 138 could have more or less autonomy.

In the examples shown, the TTU 138 receives commands via SM 132 instructions and writes results back to an SM register file. For many common use cases (e.g., opaque triangles with at most one level of instancing), the TTU 138 can service the ray tracing query without further interaction with the SM 132. More complicated queries (e.g., involving alpha-tested triangles, primitives other than triangles, or multiple levels of instancing) may require multiple round trips (although the technology herein reduces the need for such "round trips" for certain kinds of geometry by providing the TTU 138 with enhanced capabilities to autonomously perform ray-bounding-volume intersection testing without the need to ask the calling SM for help). In addition to tracing rays, the TTU 138 is capable of performing more general spatial queries where an AABB or the extruded volume between two AABBs (which we call a "beam") takes the place of the ray. Thus, while the TTU 138 is especially adapted to accelerate ray tracing related tasks, it can also be used to perform tasks other than ray tracing.

The TTU 138 thus autonomously performs a test of each ray against a wide range of bounding volumes, and can cull any bounding volumes that don't intersect with that ray. Starting at a root node that bounds everything in the scene (or in some cases, starting at an alternate root as discussed above), the traversal co-processor tests each ray against smaller (potentially overlapping) child bounding volumes which in turn bound the descendent branches of the BVH. The ray follows the child pointers for the bounding volumes the ray hits to other nodes until the leaves or terminal nodes (volumes) of the BVH are reached.

Once the TTU 138 traverses the acceleration data structure to reach a terminal or "leaf" node (which may be represented by one or multiple bounding volumes) that intersects the ray and contains a geometric primitive, it performs an accelerated ray-primitive intersection test to determine whether the ray intersects that primitive (and thus the object surface that primitive defines). The ray-primitive test can provide additional information about primitives the ray intersects that can be used to determine the material properties of the surface required for shading and visualization. Recursive traversal through the acceleration data structure enables the traversal co-processor to discover all object primitives the ray intersects, or the closest (from the perspective of the viewpoint) primitive the ray intersects (which in some cases is the only primitive that is visible from the viewpoint along the ray). See e.g., Lefrancois et al, NVIDIA Vulkan Ray Tracing Tutorial, December 2019, https://developer.nvidia.com/rtx/raytracing/vkray As mentioned above, the TTU 138 also accelerates the transform of each ray from world space into object space to obtain finer and finer bounding box encapsulations of the primitives and reduce the duplication of those primitives across the scene. As described above, objects replicated many times in the scene at different positions, orientations and scales can be represented in the scene as instance nodes which associate a bounding box and leaf node in the world space BVH with a transformation that can be applied to the world-space ray to transform it into an object coordinate space, and a pointer to an object-space BVH. This avoids replicating the object space BVH data multiple times in world space, saving memory and associated memory accesses. The instance transform increases efficiency by transforming the ray into object space instead of requiring the geometry or the bounding volume hierarchy to be transformed into world (ray) space and is also compatible with additional, conventional rasterization processes that graphics processing performs to visualize the primitives.

Example Ray Tracing Processes

Figure 10:
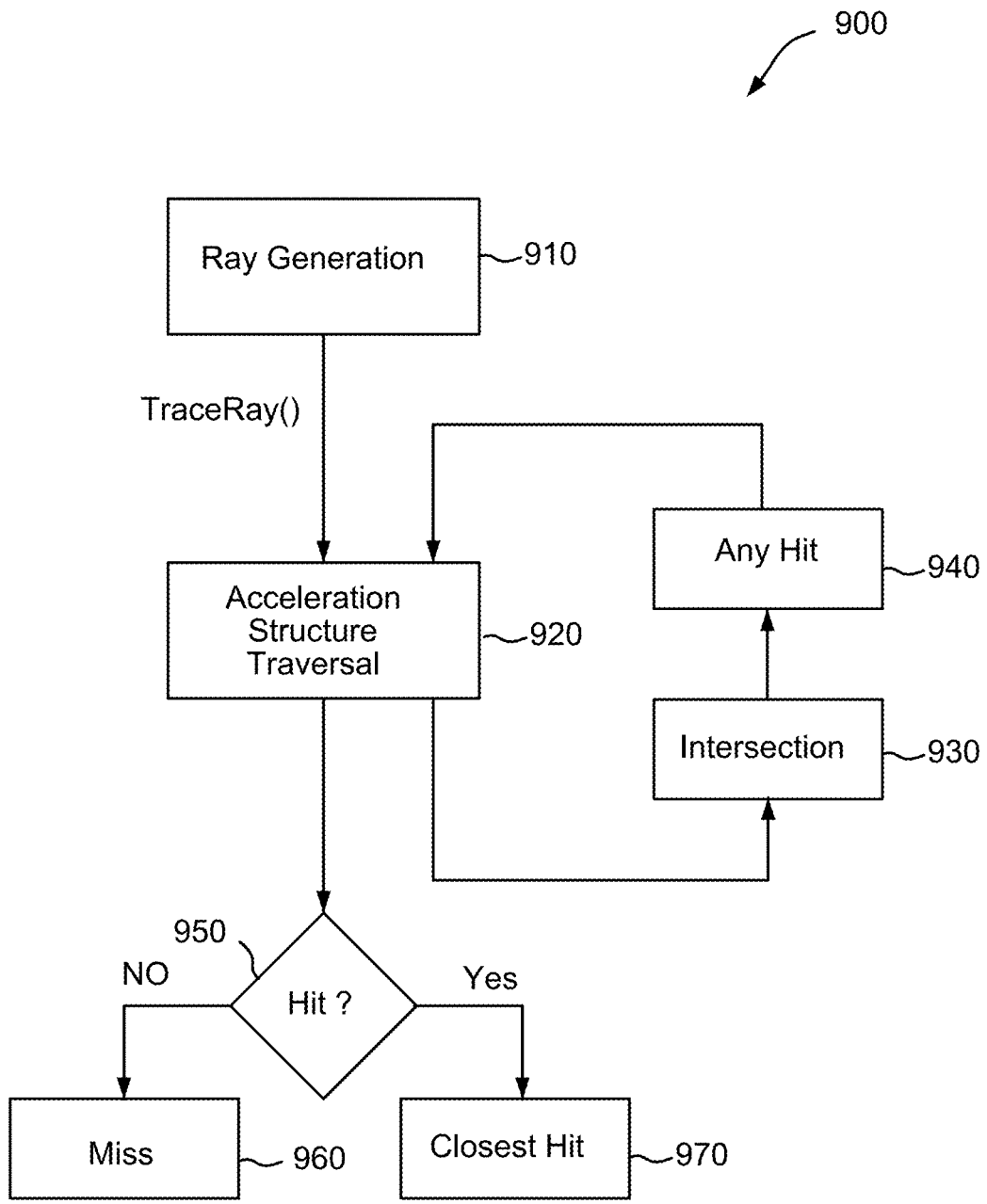
FIG. 10 is a flowchart of an example non-limiting ray tracing graphics pipeline.

FIG. 10 shows an exemplary ray tracing shading pipeline 900 that may be performed by SM 132 and accelerated by TTU 138. The ray tracing shading pipeline 900 starts by an SM 132 invoking ray generation 910 and issuing a corresponding ray tracing request to the TTU 138. The ray tracing request identifies a single ray cast into the scene and asks the TTU 138 to search for intersections with an acceleration data structure the SM 132 also specifies. The TTU 138 traverses (FIG. 10 block 920) the acceleration data structure to determine intersections or potential intersections between the ray and the volumetric subdivisions and associated triangles the acceleration data structure represents. Potential intersections can be identified by finding bounding volumes in the acceleration data structure that are intersected by the ray. Descendants of non-intersected bounding volumes need not be examined.

For triangles within intersected bounding volumes, the TTU 138 ray-primitive test block 720 performs an intersection 930 process to determine whether the ray intersects the primitives. The TTU 138 returns intersection information to the SM 132, which may perform an "any hit" shading operation 940 in response to the intersection determination. For example, the SM 132 may perform (or have other hardware perform) a texture lookup for an intersected primitive and decide based on the appropriate texel's value how to shade a pixel visualizing the ray. The SM 132 keeps track of such results since the TTU 138 may return multiple intersections with different geometry in the scene in arbitrary order.

Figure 11:
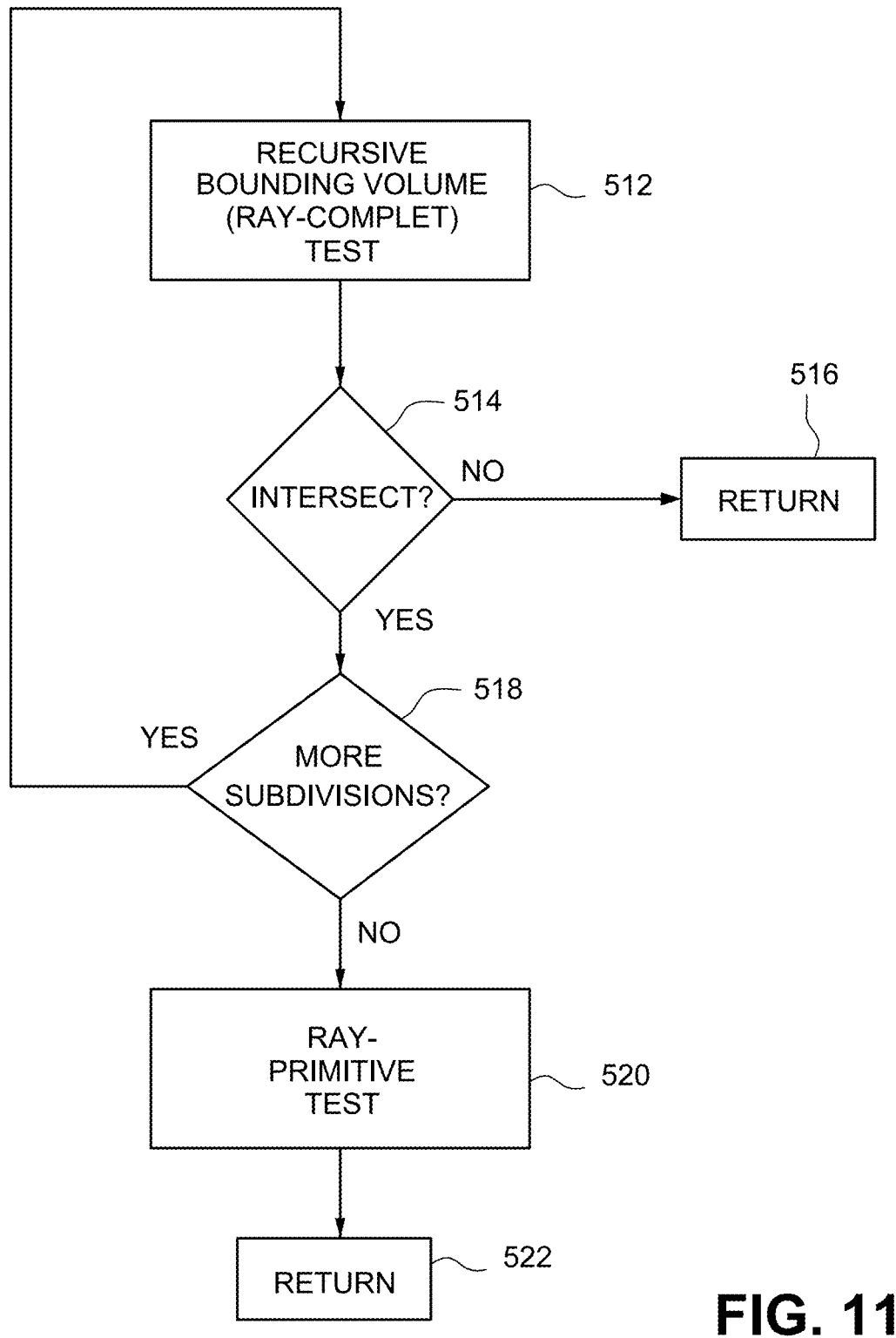
FIG. 11 is a flowchart of example non-limiting hardware based ray tracing operations.

FIG. 11 is a flowchart summarizing example ray tracing operations the TTU 138 performs as described above in cooperation with SM(s) 132. The FIG. 11 operations are performed by TTU 138 in cooperation with its interaction with an SM 132. The TTU 138 may thus receive the identification of a ray from the SM 132 and traversal state enumerating one or more nodes in one or more BVH's that the ray must traverse. The TTU 138 determines which bounding volumes of a BVH data structure the ray intersects (the "ray-complet" test 512). The TTU 138 can also subsequently determine whether the ray intersects one or more primitives in the intersected bounding volumes and which triangles are intersected (the "ray-primitive test" 520)—or the SM 132 can perform this test in software if it is too complicated for the TTU to perform itself. In example non-limiting embodiments, complets specify root or interior nodes (i.e., volumes) of the bounding volume hierarchy with children that are other complets or leaf nodes of a single type per complet.

Figure 1A:
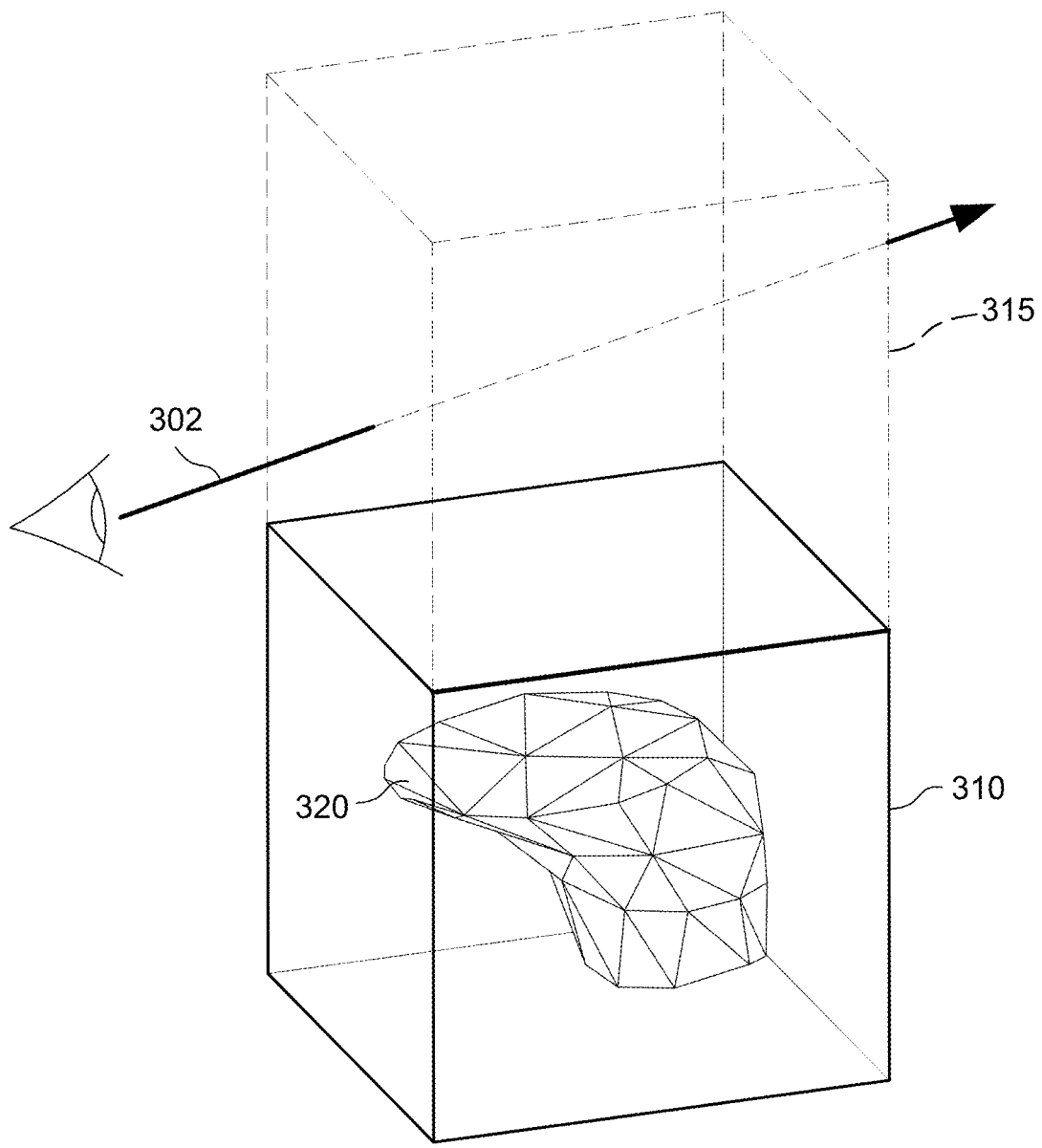
FIGS. 1A-1C show example simplified ray tracing tests to determine whether the ray passes through a bounding volume containing geometry and whether the ray intersects geometry within the bounding volume.
Figure 1B:
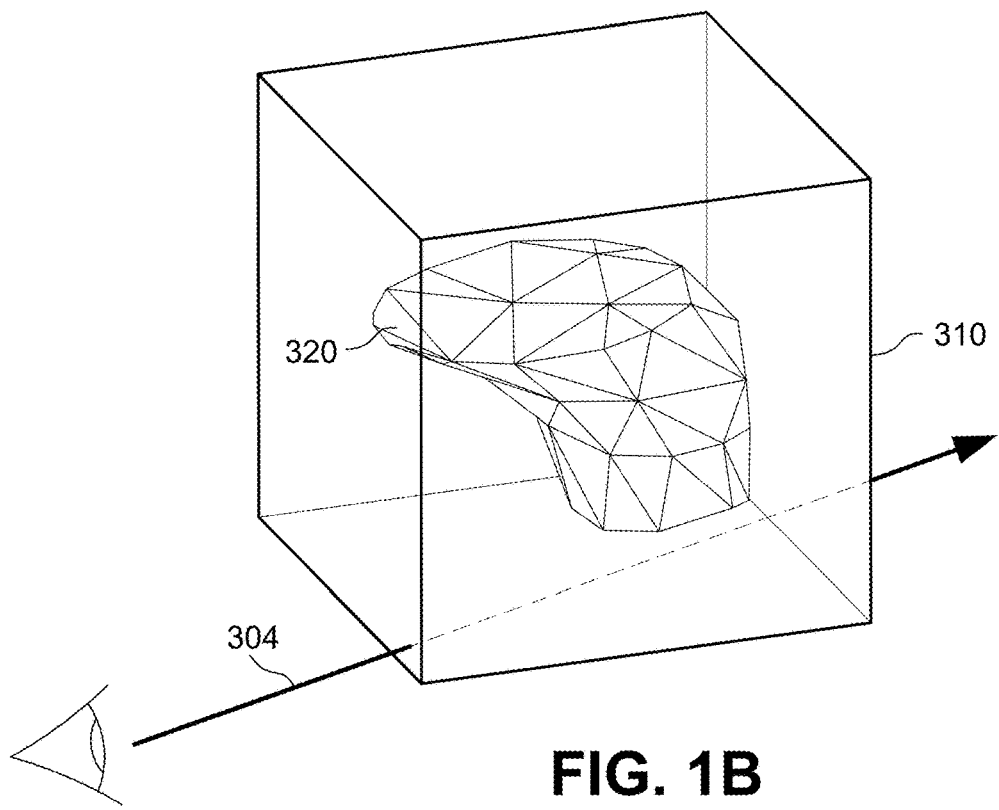
Figure 1C:
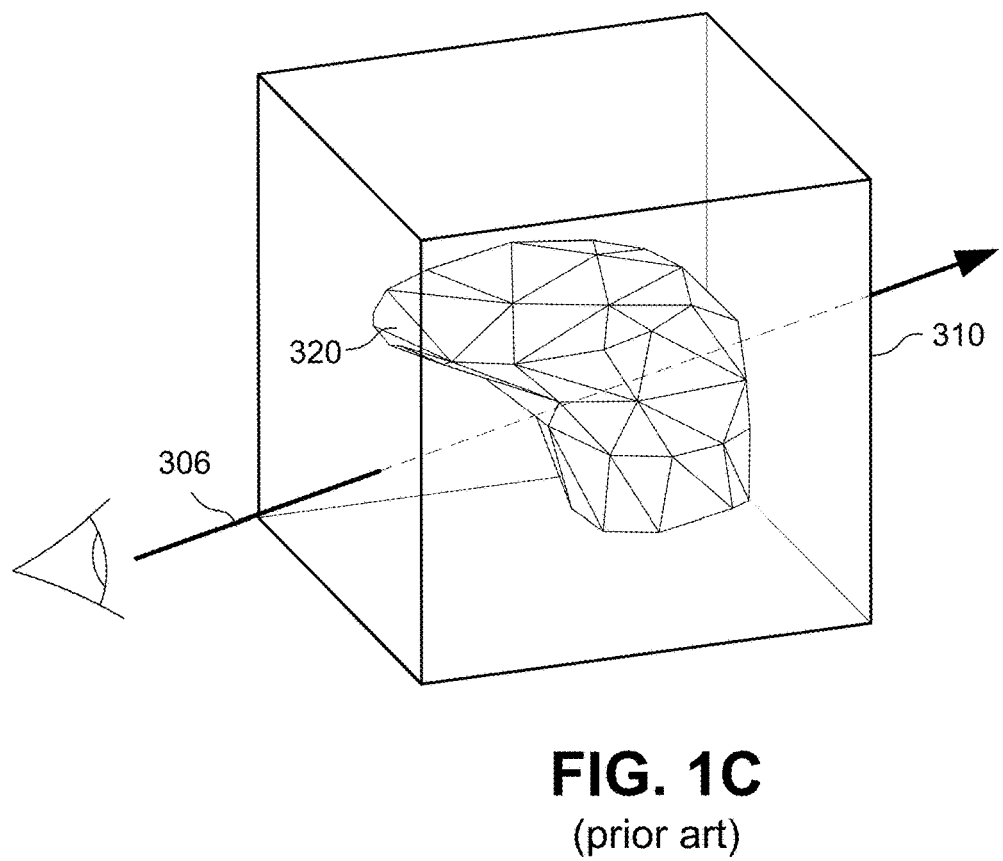

First, the TTU 138 inspects the traversal state of the ray. If a stack the TTU 138 maintains for the ray is empty, then traversal is complete. If there is an entry on the top of the stack, the traversal co-processor 138 issues a request to the memory subsystem to retrieve that node. The traversal co-processor 138 then performs a bounding box test 512 to determine if a bounding volume of a BVH data structure is intersected by a particular ray the SM 132 specifies (step 512, 514). If the bounding box test determines that the bounding volume is not intersected by the ray ("No" in step 514), then there is no need to perform any further testing for visualization and the TTU 138 can return this result to the requesting SM 132. This is because if a ray misses a bounding volume (as in FIG. 1A with respect to bounding volume 310), then the ray will miss all other smaller bounding volumes inside the bounding volume being tested and any primitives that bounding volume contains.

If the bounding box test performed by the TTU 138 reveals that the bounding volume is intersected by the ray ("Yes" in Step 514), then the TTU determines if the bounding volume can be subdivided into smaller bounding volumes (step 518). In one example embodiment, the TTU 138 isn't necessarily performing any subdivision itself. Rather, each node in the BVH has one or more children (where each child is a leaf or a branch in the BVH). For each child, there is one or more bounding volumes and a pointer that leads to a branch or a leaf node. When a ray processes a node using TTU 138, it is testing itself against the bounding volumes of the node's children. The ray only pushes stack entries onto its stack for those branches or leaves whose representative bounding volumes were hit. When a ray fetches a node in the example embodiment, it doesn't test against the bounding volume of the node—it tests against the bounding volumes of the node's children. The TTU 138 pushes nodes whose bounding volumes are hit by a ray onto the ray's traversal stack in an order determined by ray configuration. For example, it is possible to push nodes onto the traversal stack in the order the nodes appear in memory, or in the order that they appear along the length of the ray, or in some other order. If there are further subdivisions of the bounding volume ("Yes" in step 518), then those further subdivisions of the bounding volume are accessed and the bounding box test is performed for each of the resulting subdivided bounding volumes to determine which subdivided bounding volumes are intersected by the ray and which are not. In this recursive process, some of the bounding volumes may be eliminated by test 514 while other bounding volumes may result in still further and further subdivisions being tested for intersection by TTU 138 recursively applying steps 512-518.

Once the TTU 138 determines that the bounding volumes intersected by the ray are leaf nodes ("No" in step 518), the TTU 138 and/or SM 132 performs a primitive (e.g., triangle) intersection test 520 to determine whether the ray intersects primitives in the intersected bounding volumes and which primitives the ray intersects. The TTU 138 thus performs a depth-first traversal of intersected descendent branch nodes until leaf nodes are reached. The TTU 138 processes the leaf nodes. If the leaf nodes are primitive ranges, the TTU 138 or the SM 132 tests them against the ray. If the leaf nodes are instance nodes, the TTU 138 or the SM 132 applies the instance transform. If the leaf nodes are item ranges, the TTU 138 returns them to the requesting SM 132. In the example non-limiting embodiments, the SM 132 can command the TTU 138 to perform different kinds of ray-primitive intersection tests and report different results depending on the operations coming from an application (or an software stack the application is running on) and relayed by the SM to the TTU. For example, the SM 132 can command the TTU 138 to report the nearest visible primitive revealed by the intersection test, or to report all primitives the ray intersects irrespective of whether they are the nearest visible primitive. The SM 132 can use these different results for different kinds of visualization. Or the SM 132 can perform the ray-primitive intersection test itself once the TTU 138 has reported the ray-complet test results. Once the TTU 138 is done processing the leaf nodes, there may be other branch nodes (pushed earlier onto the ray's stack) to test.

Example Non-Limiting TTU 138 Hardware Implementation

Figure 12:
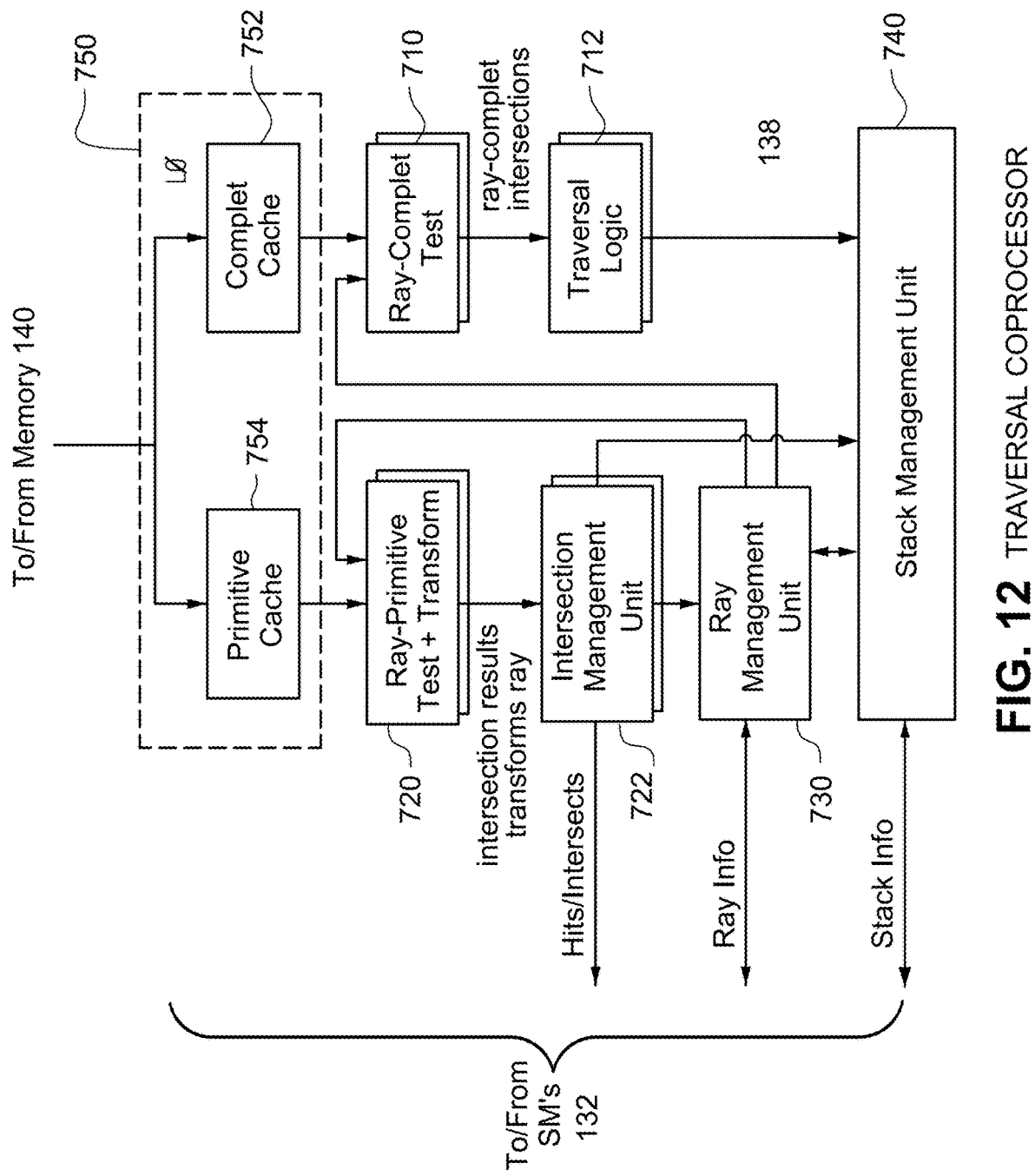
FIG. 12 shows a simplified example non-limiting traversal co-processor comprising a tree traversal unit (TTU).
Figure 13:
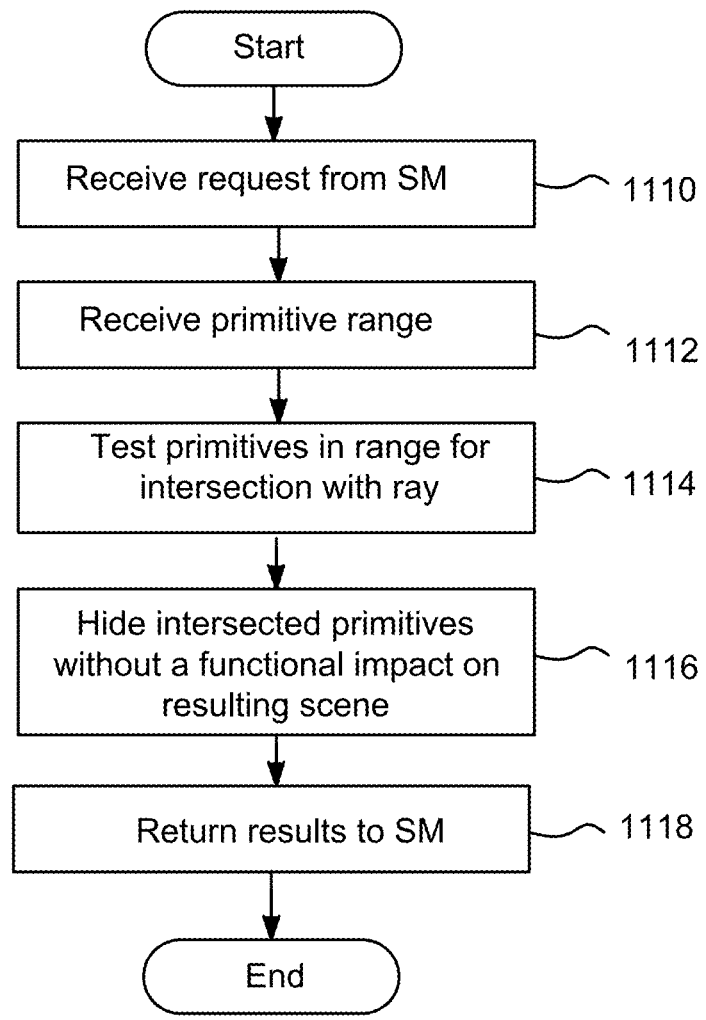
FIG. 13 is a flowchart of example TTU processing.

FIG. 12 shows an example simplified block diagram of TTU 138 including hardware configured to perform accelerated traversal operations as described above. In some embodiments, the TTU 138 may perform a depth-first traversal of a bounding volume hierarchy using a short stack traversal with intersection testing of supported leaf node primitives and mid-traversal return of alpha primitives and unsupported leaf node primitives (items). The TTU 138 includes dedicated hardware to determine whether a ray intersects bounding volumes and dedicated hardware to determine whether a ray intersects primitives of the tree data structure.

In more detail, TTU 138 includes an intersection management block 722, a ray management block 730 and a stack management block 740. Each of these blocks (and all of the other blocks in FIG. 12) may constitute dedicated hardware implemented by logic gates, registers, hardware-embedded lookup tables or other combinatorial logic, etc.

The ray management block 730 is responsible for managing information about and performing operations concerning a ray specified by an SM 132 to the ray management block. The stack management block 740 works in conjunction with traversal logic 712 to manage information about and perform operations related to traversal of a BVH acceleration data structure. Traversal logic 712 is directed by results of a ray-complet test block 710 that tests intersections between the ray indicated by the ray management block 730 and volumetric subdivisions represented by the BVH, using instance transforms as needed. The ray-complet test block 710 retrieves additional information concerning the BVH from memory 140 via an L0 complet cache 752 that is part of the TTU 138. The results of the ray-complet test block 710 informs the traversal logic 712 as to whether further recursive traversals are needed. The stack management block 740 maintains stacks to keep track of state information as the traversal logic 712 traverses from one level of the BVH to another, with the stack management block 740 pushing items onto the stack as the traversal logic traverses deeper into the BVH and popping items from the stack as the traversal logic traverses upwards in the BVH. The stack management block 740 is able to provide state information (e.g., intermediate or final results) to the requesting SM 132 at any time the SM requests.

The intersection management block 722 manages information about and performs operations concerning intersections between rays and primitives, using instance transforms as needed. The ray-primitive test block 720 retrieves information concerning geometry from memory 140 on an as-needed basis via an L0 primitive cache 754 that is part of TTU 138. The intersection management block 722 is informed by results of intersection tests the ray-primitive test and transform block 720 performs. Thus, the ray-primitive test and transform block 720 provides intersection results to the intersection management block 722, which reports geometry hits and intersections to the requesting SM 132.

A Stack Management Unit 740 inspects the traversal state to determine what type of data needs to be retrieved and which data path (complet or primitive) will consume it. The intersections for the bounding volumes are determined in the ray-complet test path of the TTU 138 including one or more ray-complet test blocks 710 and one or more traversal logic blocks 712. A complet specifies root or interior nodes of a bounding volume. Thus, a complet may define one or more bounding volumes for the ray-complet test. In example embodiments herein, a complet may define a plurality of "child" bounding volumes that (whether or not they represent leaf nodes) that don't necessarily each have descendants but which the TTU will test in parallel for ray-bounding volume intersection to determine whether geometric primitives associated with the plurality of bounding volumes need to be tested for intersection.

The ray-complet test path of the TTU 138 identifies which bounding volumes are intersected by the ray. Bounding volumes intersected by the ray need to be further processed to determine if the primitives associated with the intersected bounding volumes are intersected. The intersections for the primitives are determined in the ray-primitive test path including one or more ray-primitive test and transform blocks 720 and one or more intersection management blocks 722.

The TTU 138 receives queries from one or more SMs 132 to perform tree traversal operations. The query may request whether a ray intersects bounding volumes and/or primitives in a BVH data structure. The query may identify a ray (e.g., origin, direction, and length of the ray) and a BVH data structure and traversal state (short stack) which includes one or more entries referencing nodes in one or more Bounding Volume Hierarchies that the ray is to visit. The query may also include information for how the ray is to handle specific types of intersections during traversal. The ray information may be stored in the ray management block 730. The stored ray information (e.g., ray length) may be updated based on the results of the ray-primitive test.

The TTU 138 may request the BVH data structure identified in the query to be retrieved from memory outside of the TTU 138. Retrieved portions of the BVH data structure may be cached in the level-zero (L0) cache 750 within the TTU 138 so the information is available for other time-coherent TTU operations, thereby reducing memory 140 accesses. Portions of the BVH data structure needed for the ray-complet test may be stored in a L0 complet cache 752 and portions of the BVH data structure needed for the ray-primitive test may be stored in an L0 primitive cache 754.

After the complet information needed for a requested traversal step is available in the complet cache 752, the ray-complet test block 710 determines bounding volumes intersected by the ray. In performing this test, the ray may be transformed from the coordinate space of the bounding volume hierarchy to a coordinate space defined relative to a complet. The ray is tested against the bounding boxes associated with the child nodes of the complet. In the example non-limiting embodiment, the ray is not tested against the complet's own bounding box because (1) the TTU 138 previously tested the ray against a similar bounding box when it tested the parent bounding box child that referenced this complet, and (2) a purpose of the complet bounding box is to define a local coordinate system within which the child bounding boxes can be expressed in compressed form. If the ray intersects any of the child bounding boxes, the results are pushed to the traversal logic to determine the order that the corresponding child pointers will be pushed onto the traversal stack (further testing will likely require the traversal logic 712 to traverse down to the next level of the BVH). These steps are repeated recursively until intersected leaf nodes of the BVH are encountered The ray-complet test block 710 may provide ray-complet intersections to the traversal logic 712. Using the results of the ray-complet test, the traversal logic 712 creates stack entries to be pushed to the stack management block 740. The stack entries may indicate internal nodes (i.e., a node that includes one or more child nodes) that need to be further tested for ray intersections by the ray-complet test block 710 and/or triangles identified in an intersected leaf node that need to be tested for ray intersections by the ray-primitive test and transform block 720. The ray-complet test block 710 may repeat the traversal on internal nodes identified in the stack to determine all leaf nodes in the BVH that the ray intersects. The precise tests the ray-complet test block 710 performs will in the example non-limiting embodiment be determined by mode bits, ray operations (see below) and culling of hits, and the TTU 138 may return intermediate as well as final results to the SM 132.

Ray-Primitive Intersection Testing

Referring again to FIG. 12, the TTU 138 also has the ability to accelerate intersection tests that determine whether a ray intersects particular geometry or primitives enclosed by bounding volumes. For some cases in which the geometry is sufficiently complex (e.g., defined by procedural primitives such as curves or other abstract constructs as opposed to e.g., vertices) that TTU 138 in some embodiments may not be able to help with the ray-primitive intersection testing. In such cases, the TTU 138 simply reports the ray-complet intersection test results to the SM 132, and the SM 132 performs the ray-primitive intersection test itself. In other cases (e.g., triangles), the TTU 138 can perform the ray-triangle intersection test itself, thereby further increasing performance of the overall ray tracing process. For sake of completeness, the following describes how the TTU 138 can perform or accelerate the ray-primitive intersection testing.

As explained above, leaf nodes (found to be intersected by the ray identify (enclose) primitives that may or may not be intersected by the ray. One option is for the TTU 138 to provide e.g., a range of geometry identified in the intersected leaf nodes to the SM 132 for further processing. For example, the SM 132 may itself determine whether the identified primitives are intersected by the ray based on the information the TTU 138 provides as a result of the TTU traversing the BVH. To offload this processing from the SM 132 and thereby accelerate it using the hardware of the TTU 138, the stack management block 740 may issue requests for the ray-primitive and transform block 720 to perform a ray-primitive test for the primitives within intersected leaf nodes the TTU's ray-complet test block 710 identified. In some embodiments, the SM 132 may issue a request for the ray-primitive test to test a specific range of primitives and transform block 720 irrespective of how that geometry range was identified.

After making sure the primitive data needed for a requested ray-primitive test is available in the primitive cache 754, the ray-primitive and transform block 720 may determine primitives that are intersected by the ray using the ray information stored in the ray management block 730. The ray-primitive test block 720 provides the identification of primitives determined to be intersected by the ray to the intersection management block 722.

The intersection management block 722 can return the results of the ray-primitive test to the SM 132. The results of the ray-primitive test may include identifiers of intersected primitives, the distance of intersections from the ray origin and other information concerning properties of the intersected primitives. In some embodiments, the intersection management block 722 may modify an existing ray-primitive test (e.g., by modifying the length of the ray) based on previous intersection results from the ray-primitive and transform block 720.

The intersection management block 722 may also keep track of different types of primitives. For example, the different types of triangles include opaque triangles that will block a ray when intersected and alpha triangles that may or may not block the ray when intersected or may require additional handling by the SM. Whether a ray is blocked or not by a transparent triangle may for example depend on texture(s) mapped onto the triangle, area of the triangle occupied by the texture and the way the texture modifies the triangle. For example, transparency (e.g., stained glass) in some embodiments requires the SM 132 to keep track of transparent object hits so they can be sorted and shaded in ray-parametric order, and typically don't actually block the ray. Meanwhile, alpha "trimming" allows the shape of the primitive to be trimmed based on the shape of a texture mapped onto the primitive—for example, cutting a leaf shape out of a triangle. (Note that in raster graphics, transparency is often called "alpha blending" and trimming is called "alpha test"). In other embodiments, the TTU 138 can push transparent hits to queues in memory for later handling by the SM 132 and directly handle trimmed triangles by sending requests to the texture unit. Each triangle may include a designator to indicate the triangle type. The intersection management block 722 is configured to maintain a result queue for tracking the different types of intersected triangles. For example, the result queue may store one or more intersected opaque triangle identifiers in one queue and one or more transparent triangle identifiers in another queue.

For opaque triangles, the ray intersection for less complex geometry can be fully determined in the TTU 138 because the area of the opaque triangle blocks the ray from going past the surface of the triangle. For transparent triangles, ray intersections cannot in some embodiments be fully determined in the TTU 138 because TTU 138 performs the intersection test based on the geometry of the triangle and may not have access to the texture of the triangle and/or area of the triangle occupied by the texture (in other embodiments, the TTU may be provided with texture information by the texture mapping block of the graphics pipeline). To fully determine whether the triangle is intersected, information about transparent triangles the ray-primitive and transform block 720 determines are intersected may be sent to the SM 132, for the SM to make the full determination as to whether the triangle affects visibility along the ray.

The SM 132 can resolve whether or not the ray intersects a texture associated with the transparent triangle and/or whether the ray will be blocked by the texture. The SM 132 may in some cases send a modified query to the TTU 138 (e.g., shortening the ray if the ray is blocked by the texture) based on this determination. In one embodiment, the TTU 138 may be configured to return all triangles determined to intersect the ray to the SM 132 for further processing. Because returning every triangle intersection to the SM 132 for further processing is costly in terms of interface and thread synchronization, the TTU 138 may be configured to hide triangles which are intersected but are provably capable of being hidden without a functional impact on the resulting scene. For example, because the TTU 138 is provided with triangle type information (e.g., whether a triangle is opaque or transparent), the TTU 138 may use the triangle type information to determine intersected triangles that are occluded along the ray by another intersecting opaque triangle and which thus need not be included in the results because they will not affect the visibility along the ray. If the TTU 138 knows that a triangle is occluded along the ray by an opaque triangle, the occluded triangle can be hidden from the results without impact on visualization of the resulting scene.

The intersection management block 722 may include a result queue for storing hits that associate a triangle ID and information about the point where the ray hit the triangle. When a ray is determined to intersect an opaque triangle, the identity of the triangle and the distance of the intersection from the ray origin can be stored in the result queue. If the ray is determined to intersect another opaque triangle, the other intersected opaque triangle can be omitted from the result if the distance of the intersection from the ray origin is greater than the distance of the intersected opaque triangle already stored in the result queue. If the distance of the intersection from the ray origin is less than the distance of the intersected opaque triangle already stored in the result queue, the other intersected opaque triangle can replace the opaque triangle stored in the result queue. After all of the triangles of a query have been tested, the opaque triangle information stored in the result queue and the intersection information may be sent to the SM 132.

In some embodiments, once an opaque triangle intersection is identified, the intersection management block 722 may shorten the ray stored in the ray management block 730 so that bounding volumes (which may include triangles) behind the intersected opaque triangle (along the ray) will not be identified as intersecting the ray.

The intersection management block 722 may store information about intersected transparent triangles in a separate queue. The stored information about intersected transparent triangles may be sent to the SM 132 for the SM to resolve whether or not the ray intersects a texture associated with the triangle and/or whether the texture blocks the ray. The SM may return the results of this determination to the TTU 138 and/or modify the query (e.g., shorten the ray if the ray is blocked by the texture) based on this determination.

As discussed above, the TTU 138 allows for quick traversal of an acceleration data structure (e.g., a BVH) to determine which primitives (e.g., triangles used for generating a scene) in the data structure are intersected by a query data structure (e.g., a ray). For example, the TTU 138 may determine which triangles in the acceleration data structure are intersected by the ray and return the results to the SM 132. However, returning to the SM 132 a result on every triangle intersection is costly in terms of interface and thread synchronization. The TTU 138 provides a hardware logic configured to hide those items or triangles which are provably capable of being hidden without a functional impact on the resulting scene. The reduction in returns of results to the SM and synchronization steps between threads greatly improves the overall performance of traversal. The example non-limiting embodiments of the TTU 138 disclosed in this application provides for some of the intersections to be discarded within the TTU 138 without SM 132 intervention so that less intersections are returned to the SM 132 and the SM 132 does not have to inspect all intersected triangles or item ranges.

Example Instancing Pipeline Implementation By TTU 138 and SM 132

As discussed above, one example feature of embodiments herein relates to hoisting GASes from BLAS to TLAS levels of the acceleration structure. This is commonly done in example embodiments through instance transforms, as explained above. For sake of completeness, the following describes how TTU 138 in example embodiments performs instancing and associated transforms.

Figure 14A:
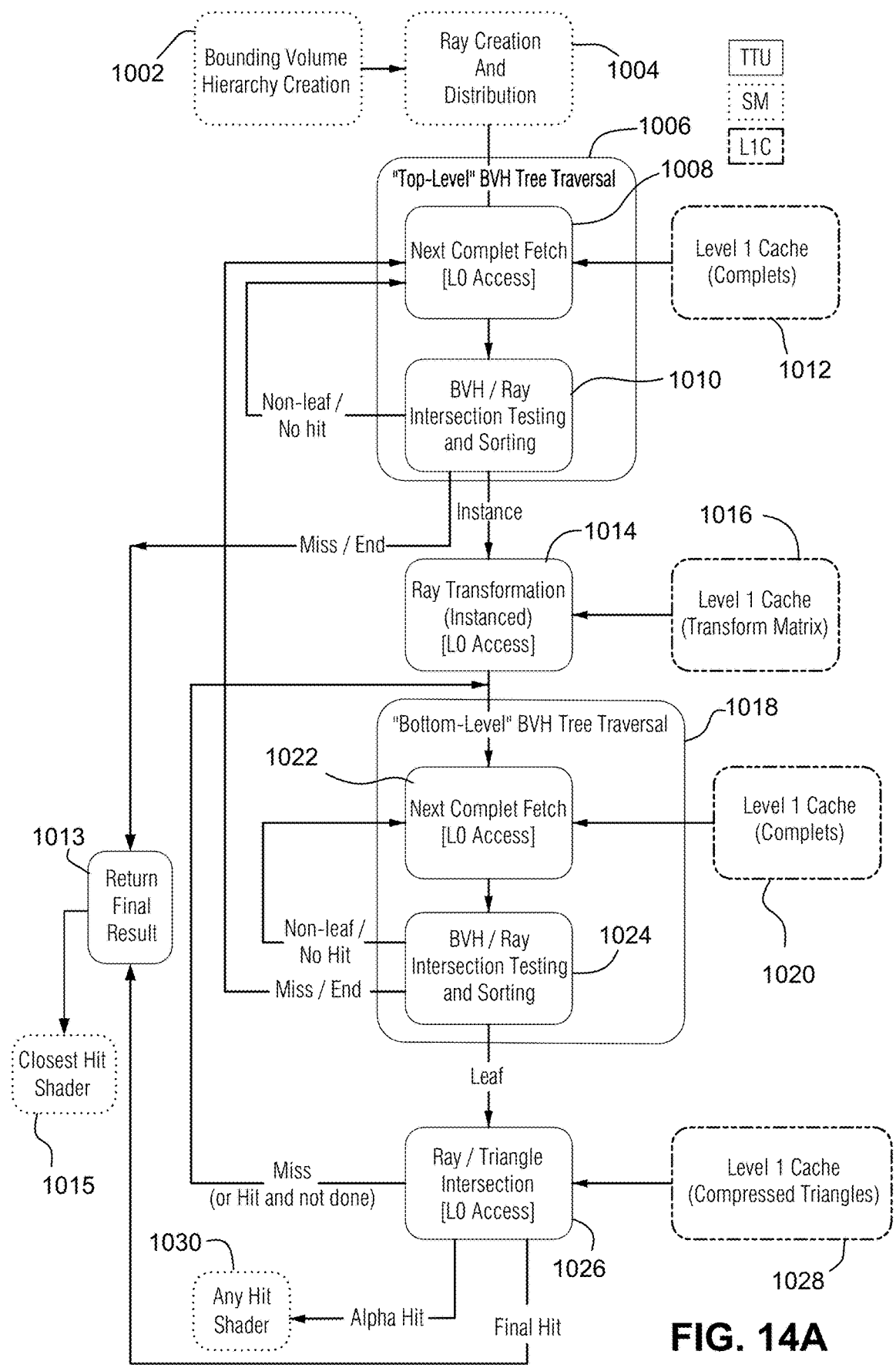
FIGS. 14A and 14B illustrate more detailed ray tracing pipelines to handle instancing.

The FIG. 14A more detailed diagram of a ray-tracing pipeline flowchart shows the data flow and interaction between components for a representative use case: tracing rays against a scene containing geometric primitives, with instance transformations handled in hardware. In one example non-limiting embodiment, the ray-tracing pipeline of FIG. 14A is essentially software-defined (which in example embodiments means it is determined by the SMs 132) but makes extensive use of hardware acceleration by TTU 138. Key components include the SM 132 (and the rest of the compute pipeline), the TTU 138 (which serves as a coprocessor to SM), and the L1 cache and downstream memory system, from which the TTU fetches BVH and triangle data.

The pipeline shown in FIG. 14A shows that bounding volume hierarchy creation 1002 can be performed ahead of time by a development system. It also shows that ray creation and distribution 1004 are performed or controlled by the SM 132 or other software in the example embodiment, as shading (which can include lighting and texturing).

The example pipeline includes a "top level" BVH tree traversal 1006, ray transformation 1014, "bottom level" BVH tree traversal 1018, and a ray/triangle (or other primitive) intersection 1026 that are each performed by the TTU 138. These do not have to be performed in the order shown, as handshaking between the TTU 138 and the SM 132 determines what the TTU 138 does and in what order.

The SM 132 presents one or more rays to the TTU 138 at a time. Each ray the SM 132 presents to the TTU 138 for traversal may include the ray's geometric parameters, traversal state, and the ray's ray flags, mode flags and ray operations information. In an example embodiment, a ray operation (RayOp) provides or comprises an auxiliary arithmetic and/or logical test to suppress, override, and/or allow storage of an intersection. The traversal stack may also be used by the SM 132 to communicate certain state information to the TTU 138 for use in the traversal. A new ray query may be started with an explicit traversal stack. For some queries, however, a small number of stack initializers (see FIG. 6E) may be provided for beginning the new query of a given type, such as, for example: traversal starting from a particular complet; intersection of a ray with a range of triangles; intersection of a ray with a range of triangles, followed by traversal starting from a complet; vertex fetch from a triangle buffer for a given triangle, etc. In some embodiments, using stack initializers instead of explicit stack initialization improves performance because stack initializers require fewer streaming processor registers and reduce the number of parameters that need to be transmitted from the streaming processor to the TTU.

In the example embodiment, a set of mode flags the SM 132 presents with each query (e.g., ray) may at least partly control how the TTU 138 will process the query when the query intersects the bounding volume of a specific type or intersects a primitive of a specific primitive type. The mode flags the SM 132 provides to the TTU 138 enable the ability by the SM and/or the application to e.g., through a RayOp, specify an auxiliary arithmetic or logical test to suppress, override, or allow storage of an intersection. The mode flags may for example enable traversal behavior to be changed in accordance with such aspects as, for example, a depth (or distance) associated with each bounding volume and/or primitive, size of a bounding volume or primitive in relation to a distance from the origin or the ray, particular instances of an object, etc. This capability can be used by applications to dynamically and/or selectively enable/disable sets of objects for intersection testing versus specific sets or groups of queries, for example, to allow for different versions of models to be used when application state changes (for example, when doors open or close) or to provide different versions of a model which are selected as a function of the length of the ray to realize a form of geometric level of detail, or to allow specific sets of objects from certain classes of rays to make some layers visible or invisible in specific views.

In addition to the set of mode flags which may be specified separately for the ray-complet intersection and for ray-primitive intersections, the ray data structure may specify other RayOp test related parameters, such as ray flags, ray parameters and a RayOp test. The ray flags can be used by the TTU 138 to control various aspects of traversal behavior, back-face culling, and handling of the various child node types, subject to a pass/fail status of an optional RayOp test. RayOp tests add flexibility to the capabilities of the TTU 138, at the expense of some complexity. The TTU 138 reserves a "ray slot" for each active ray it is processing, and may store the ray flags, mode flags and/or the RayOp information in the corresponding ray slot buffer within the TTU during traversal.

In the example shown in FIG. 14A, the TTU 138 performs a top level tree traversal 1006 and a bottom level tree traversal 1018. In the example embodiment, the two level traversal of the BVH enables fast ray tracing responses to dynamic scene changes. As discussed above, it is possible to hoist complet information from the bottom level tree traversal 1018 to the top level tree traversal 1006. This enables alignment for a single primitive to be more tightly fit in its own object space, and then placed in a common world space e.g., via a transform by the BVH builder while reducing the number of instance transforms the TTU 138 needs to perform during real time ray tracing operations.

Ray transformation 1014 provides the appropriate transition from the top level tree traversal 1006 to the bottom level tree traversal 1018 by transforming the ray, which may be used in the top level traversal in a first coordinate space (e.g., world space), to a different coordinate space (e.g., object space) of the BVH of the bottom level traversal. An example BVH traversal technique using a two level traversal is described in previous literature, see, e.g., Woop, "A Ray Tracing Hardware Architecture for Dynamic Scenes", Universitat des Saarlandes, 2004, but embodiments are not limited thereto.

Example Top Level Tree Traversal

The top level tree traversal 1006 by TTU 138 receives complets from the L1 cache 1012, and provides an instance to the ray transformation 1014 for transformation, or a miss/end output 1013 to the SM 132 for closest hit shader 1015 processing by the SM (this block can also operate recursively based on non-leaf nodes/no hit conditions). In the top level tree traversal 1006, a next complet fetch step 1008 fetches the next complet to be tested for ray intersection in step 1010 from the memory and/or cache hierarchy and ray-bounding volume intersection testing is done on the bounding volumes in the fetched complet.

Figure 14B:
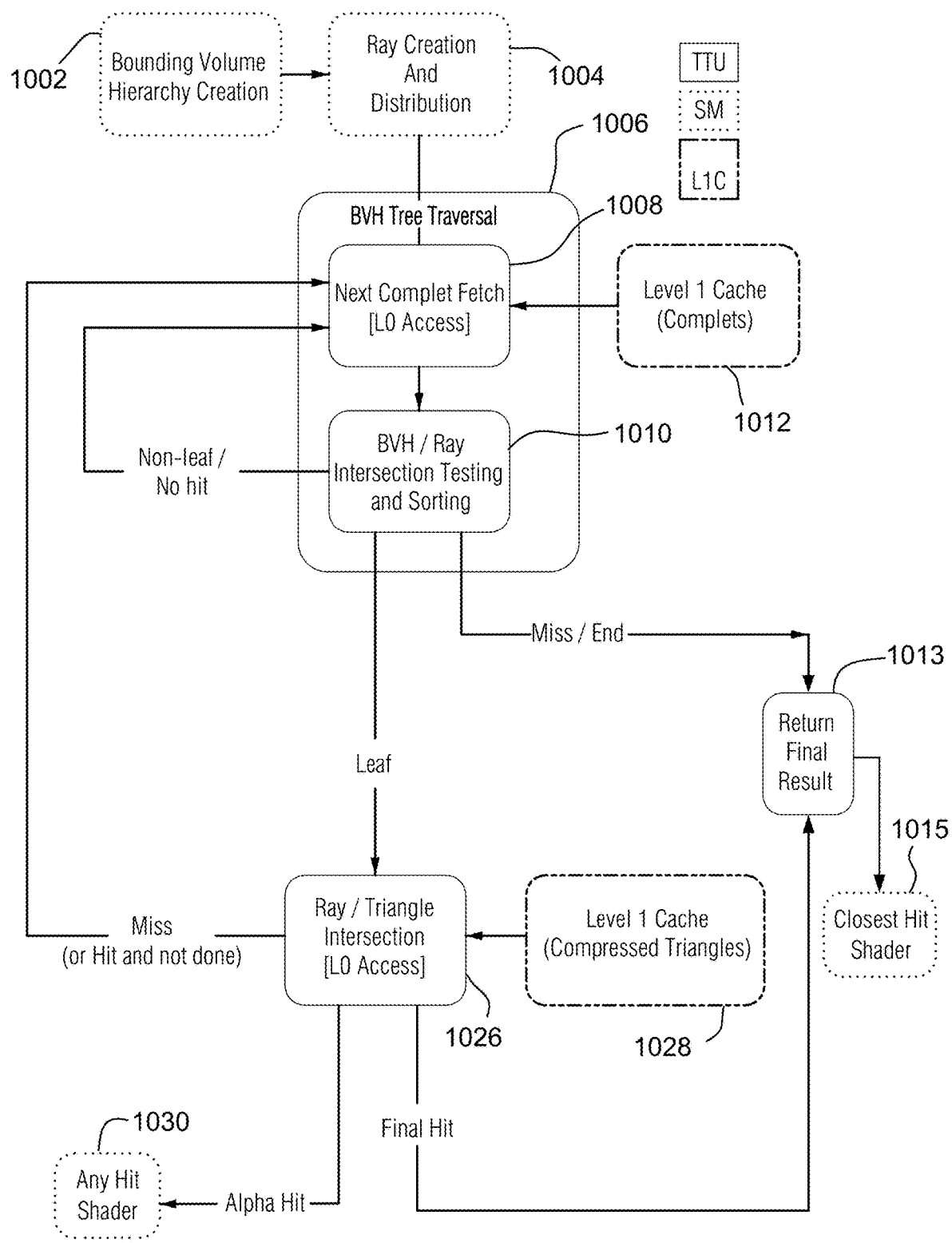

As described above, an instance node connects one BVH to another BVH which is in a different coordinate system. When a child of the intersected bounding volume is an instance node, the ray transformation 1014 is able to retrieve an appropriate transform matrix from the L1 cache 1016. The TTU 138, using the appropriate transform matrix, transforms the ray to the coordinate system of the child BVH. U.S. patent application Ser. No. 14/697,480 describes transformation nodes that connect a first set of nodes in a tree to a second set of nodes where the first and second sets of nodes are in different coordinate systems. The instance nodes in example embodiments may be similar to the transformation nodes in U.S. application Ser. No. 14/697,480. In an alternative, non-instancing mode of TTU 138 shown in FIG. 14B, the TTU does not execute a "bottom" level tree traversal 1018 and noninstanced tree BVH traversals are performed by blocks 1008, 1010 e.g., using only one stack. The TTU 138 can switch between the FIG. 14A instanced operations and the FIG. 14B non-instanced operations based on what it reads from the BVH and/or query type. For example, a specific query type may restrict the TTU to use just the non-instanced operations. In such a query, any intersected instance nodes would be returned to the SM.

In some non-limiting embodiments, ray-bounding volume intersection testing in step 1010 is performed on each bounding volume in the fetched complet before the next complet is fetched. Other embodiments may use other techniques, such as, for example, traversing the top level traversal BVH in a depth-first manner U.S. Pat. No. 9,582,607 describes one or more complet structures and contents that may be used in example embodiments. U.S. Pat. No. 9,582,607 also describes an example traversal of complets.

When a bounding volume is determined to be intersected by the ray, the child bounding volumes (or references to them) of the intersected bounding volume are kept track of for subsequent testing for intersection with the ray and for traversal. In example embodiments, one or more stack data structures is used for keeping track of child bounding volumes to be subsequently tested for intersection with the ray. In some example embodiments, a traversal stack of a small size may be used to keep track of complets to be traversed by operation of the top level tree traversal 1006, and primitives to be tested for intersection, and a larger local stack data structure can be used to keep track of the traversal state in the bottom level tree traversal 1018.

Example Bottom Level Tree Traversal

In the bottom level tree traversal 1018, a next complet fetch step 1022 fetches the next complet to be tested for ray intersection in step 1024 from the memory and/or cache hierarchy 1020 and ray-bounding volume intersection testing is done on the bounding volumes in the fetched complet. The bottom level tree traversal, as noted above, may include complets with bounding volumes in a different coordinate system than the bounding volumes traversed in the upper level tree traversal. The bottom level tree traversal also receives complets from the L1 cache and can operate recursively or iteratively within itself based on non-leaf/no-hit conditions and also with the top level tree traversal 1006 based on miss/end detection. Intersections of the ray with the bounding volumes in the lower level BVH may be determined with the ray transformed to the coordinate system of the lower level complet retrieved. The leaf bounding volumes found to be intersected by the ray in the lower level tree traversal are then provided to the ray/triangle intersection 1026.

The leaf outputs of the bottom level tree traversal 1018 are provided to the ray/triangle intersection 1026 (which has L0 cache access as well as ability to retrieve triangles via the L1 cache 1028). The L0 complet and triangle caches may be small read-only caches internal to the TTU 138. The ray/triangle intersection 1026 may also receive leaf outputs from the top level tree traversal 1006 when certain leaf nodes are reached without traversing an instanced BVH.

After all the primitives in the primitive range have been processed, the Intersection Management Unit inspects the state of the result Queue and crafts packets to send to the Stack Management Unit and/or Ray Management Unit to update the ray's attributes and traversal state, set up the ray's next traversal step, and/or return the ray to the SM 132 (if necessary). If the result queue contains opaque or alpha intersections found during the processing of the primitive range then the Intersection Management Unit signals the parametric length (t) of the nearest opaque intersection in the result queue to the ray management unit to record as the ray's tmax to shorten the ray. To update the traversal state to set up the ray's next traversal step the Intersection Management Unit signals to the Stack Management Unit whether an opaque intersection from the primitive range is present in the resultQueue, whether one or more alpha intersections are present in the result queue, whether the resultQueue is full, whether additional alpha intersections were found in the primitive range that have not been returned to the SM and which are not present in the resultQueue, and the index of the next alpha primitive in the primitive range for the ray to test after the SM consumes the contents of the resultQueue (the index of the next primitive in the range after the alpha primitive with the highest memory-order from the current primitive range in the result queue).

When the Stack Management Unit 740 receives the packet from Intersection Management Unit 722, the Stack Management Unit 740 inspects the packet to determine the next action required to complete the traversal step and start the next one. If the packet from Intersection Management Unit 722 indicates an opaque intersection has been found in the primitive range and the ray mode bits indicate the ray is to finish traversal once any intersection has been found the Stack Management Unit 740 returns the ray and its results queue to the SM with traversal state indicating that traversal is complete (a done flag set and/or an empty top level and bottom level stack). If the packet from Intersection Management Unit 722 indicates that there are opaque or alpha intersection in the result queue and that there are remaining alpha intersections in the primitive range not present in the result queue that were encountered by the ray during the processing of the primitive range that have not already been returned to the SM, the Stack Management Unit 740 returns the ray and the result queue to the SM with traversal state modified to set the cull opaque bit to prevent further processing of opaque primitives in the primitive range and the primitive range starting index advanced to the first alpha primitive after the highest alpha primitive intersection from the primitive range returned to the SM in the ray's result queue. If the packet from Intersection Management Unit 722 indicates that no opaque or alpha intersections were found when the ray processed the primitive range the Stack Management Unit 740 pops the top of stack entry (corresponding to the finished primitive range) off the active traversal stack. If the packet from Stack Management Unit 740 indicates or that either there are opaque intersections in the result queue and the ray mode bits do not indicate that the ray is to finish traversal once any intersection has been found and/or there are alpha intersections in the result queue, but there were no remaining alpha intersections found in the primitive range not present in the result queue that have not already been returned to the SM, the Stack Management Unit 740 pops the top of stack entry (corresponding to the finished primitive range) off the active traversal stack and modifies the contents of the result queue to indicate that all intersections present in the result queue come from a primitive range whose processing was completed.

If the active stack is the bottom stack, and the bottom stack is empty the Stack Management Unit 740 sets the active stack to the top stack. If the top stack is the active stack, and the active stack is empty, then the Stack Management Unit 740 returns the ray and its result queue to the SM with traversal state indicating that traversal is complete (a done flag set and/or an empty top level and bottom level stack). If the active stack contains one or more stack entries, then the Stack Management Unit 740 inspects the top stack entry and starts the next traversal step. Testing of primitive and/or primitive ranges for intersections with a ray and returning results to the SM 132 are described in co-pending U.S. application Ser. No. 16/101,148 entitled "Conservative Watertight Ray Triangle Intersection" and U.S. application Ser. No. 16/101,196 entitled "Method for Handling Out-of-Order Opaque and Alpha Ray/Primitive Intersections", which are hereby incorporated by reference in their entireties.

Example Image Generation Pipeline Including Ray Tracing

While the above disclosure is framed in the specific context of computer graphics and visualization, ray tracing and the disclosed TTU could be used for a variety of applications beyond graphics and visualization. Non-limiting examples include sound propagation for realistic sound synthesis, simulation of sonar systems, design of optical elements and systems, particle transport simulation (e.g., for medical physics or experimental high-energy physics), general wave propagation simulation, comparison to LIDAR data for purposes e.g., of robot or vehicle localization, and others. OptiX™ has already been used for some of these application areas in the past.

For example, the ray tracing and other capabilities described above can be used in a variety of ways. For example, in addition to being used to render a scene using ray tracing, they may be implemented in combination with scan conversion techniques such as in the context of scan converting geometric building blocks (i.e., polygon primitives such as triangles) of a 3D model for generating image for display (e.g., on display 150 illustrated in FIG. 9).

Figure 15:
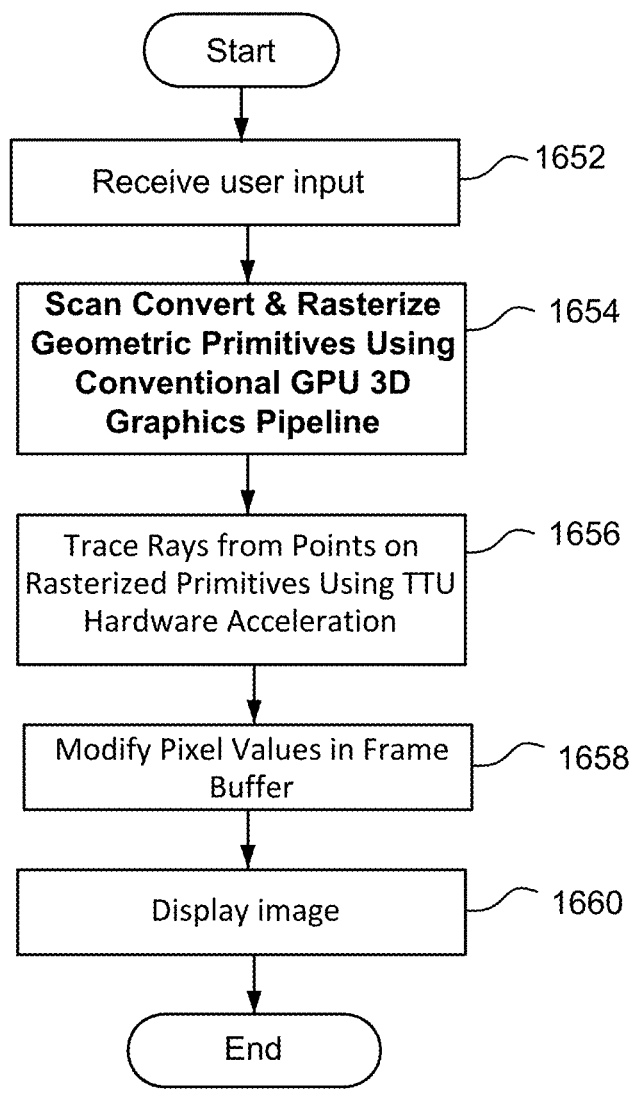
FIG. 15 is a flowchart of an example process to generate an image.

Meanwhile, however, the technology herein provides advantages when used to produce images for virtual reality, augmented reality, mixed reality, video games, motion and still picture generation, and other visualization applications. FIG. 19 illustrates an example flowchart for processing primitives to provide image pixel values of an image, in accordance with an embodiment. As FIG. 15 shows, an image of a 3D model may be generated in response to receiving a user input (Step 1652). The user input may be a request to display an image or image sequence, such as an input operation performed during interaction with an application (e.g., a game application). In response to the user input, the system performs scan conversion and rasterization of 3D model geometric primitives of a scene using conventional GPU 3D graphics pipeline (Step 1654). The scan conversion and rasterization of geometric primitives may include for example processing primitives of the 3D model to determine image pixel values using conventional techniques such as lighting, transforms, texture mapping, rasterization and the like as is well known to those skilled in the art. The generated pixel data may be written to a frame buffer.

In step 1656, one or more rays may be traced from one or more points on the rasterized primitives using TTU hardware acceleration. The rays may be traced in accordance with the one or more ray-tracing capabilities disclosed in this application. Based on the results of the ray tracing, the pixel values stored in the buffer may be modified (Step 1658). Modifying the pixel values may in some applications for example improve the image quality by, for example, applying more realistic reflections and/or shadows. An image is displayed (Step 1660) using the modified pixel values stored in the buffer.

In one example, scan conversion and rasterization of geometric primitives may be implemented using the processing system described above, and ray tracing may be implemented by the SM's 132 using the TTU architecture described in relation to FIG. 12, to add further visualization features (e.g., specular reflection, shadows, etc.). FIG. 19 is just a non-limiting example—the SM's 132 could employ the described TTU by itself without texture processing or other conventional 3D graphics processing to produce images, or the SM's could employ texture processing and other conventional 3D graphics processing without the described TTU to produce images. The SM's can also implement any desired image generation or other functionality in software depending on the application to provide any desired programmable functionality that is not bound to the hardware acceleration features provided by texture mapping hardware, tree traversal hardware or other graphics pipeline hardware.

The TTU 138 in some embodiments is stateless, meaning that no architectural state is maintained in the TTU between queries. At the same time, it is often useful for software running on the SM 1840 to request continuation of a previous query, which implies that relevant state should be written to registers by the TTU 138 and then passed back to the TTU in registers (often in-place) to continue. This state may take the form of a traversal stack that tracks progress in the traversal of the BVH.

A small number of stack initializers may also be provided for beginning a new query of a given type, for example:
   Traversal starting from a complet such as an alternate root complet
   Intersection of a ray with a range of triangles
   Intersection of a ray with a range of triangles, followed by traversal starting from a complet
   Vertex fetch from a triangle buffer for a given triangle
   Optional support for instance transforms in front of the "traversal starting from a complet" and "intersection of a ray with a range of triangles".

Vertex fetch is a simple query that may be specified with request data that consists of a stack initializer and nothing else. Other query types may require the specification of a ray or beam, along with the stack or stack initializer and various ray flags describing details of the query. A ray is given by its three-coordinate origin, three-coordinate direction, and minimum and maximum values for the t-parameter along the ray. A beam is additionally given by a second origin and direction.

Various ray flags can be used to control various aspects of traversal behavior, back-face culling, and handling of the various child node types, subject to a pass/fail status of an optional rayOp test. RayOps add considerable flexibility to the capabilities of the TTU. In some example embodiments, the RayOps portion introduces two Ray Flag versions can be dynamically selected based on a specified operation on data conveyed with the ray and data stored in the complet. To explore such flags, it's first helpful to understand the different types of child nodes allowed within a BVH, as well as the various hit types that the TTU 138 can return to the SM. Example node types are:
   A child complet (i.e., an internal node)
   By default, the TTU 138 continues traversal by descending into child complets.
   A triangle range, corresponding to a contiguous set of triangles within a triangle buffer
   (1) By default, triangle ranges encountered by a ray are handled natively by the TTU 138 by testing the triangles for intersection and shortening the ray accordingly. If traversal completes and a triangle was hit, default behavior is for the triangle ID to be returned to SM 1840, along with the t-value and barycentric coordinates of the intersection. This is the "Triangle" hit type.
   (2) By default, intersected triangles with the alpha bit set are returned to SM 1840 even if traversal has not completed. The returned traversal stack contains the state required to continue traversal if software determines that the triangle was in fact transparent.
   (3) Triangle intersection in some embodiments is not supported for beams, so encountered triangle ranges are by default returned to SM 1840 as a "TriRange" hit type, which includes a pointer to the first triangle block overlapping the range, parameters specifying the range, and the t-value of the intersection with the leaf bounding box.
   An item range, consisting of an index (derived from a user-provided "item range base" stored in the complet) and a count of items.
   By default, item ranges are returned to SM 1840 as an "ItemRange" hit type, consisting of for example an index, a count, and the t-value of the intersection with the leaf bounding box.
   An instance node.
   The TTU 138 in some embodiments can handle one level of instancing natively by transforming the ray into the coordinate system of the instance BVH. Additional levels of instancing (or every other level of instancing, depending on strategy) may be handled in software (or in other embodiments, the TTU 138 hardware can handle two, three or more levels of instancing). The "InstanceNode" hit type is provided for this purpose, consisting of a pointer to the instance node and the tvalue of the intersection with the leaf bounding box. In other implementations, the hardware can handle two, three or more levels of instancing.

In addition to the node-specific hit types, a generic "NodeRef" hit type is provided that consists of a pointer to the parent complet itself, as well as an ID indicating which child was intersected and the t-value of the intersection with the bounding box of that child.

An "Error" hit type may be provided for cases where the query or BVH was improperly formed or if traversal encountered issues during traversal.

A "None" hit type may be provided for the case where the ray or beam misses all geometry in the scene.

How the TTU handles each of the four possible node types is determined by a set of node-specific mode flags set as part of the query for a given ray. The "default" behavior mentioned above corresponds to the case where the mode flags are set to all zeroes.

Alternative values for the flags allow for culling all nodes of a given type, returning nodes of a given type to SM as a NodeRef hit type, or returning triangle ranges or instance nodes to SM using their corresponding hit types, rather than processing them natively within the TTU 138.

Additional mode flags may be provided for control handling of alpha triangles.

All patents & publications cited above are incorporated by reference as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:
1. A ray tracing method comprising:
   recognizing, in a treelet data structure including a pointer to a parent treelet data structure, an indicator declaring that the treelet data structure is a root for an acceleration structure traversal; and
   in response to recognizing the indicator, conditioning at least one traversal stack entry to prevent acceleration structure traversal from escaping to an acceleration structure node defined by the parent treelet data structure.
2. The ray tracing method of claim 1 wherein the indicator comprises a single bit.

3. The ray tracing method of claim 1 wherein conditioning comprises copying the indicator to the traversal stack entry.

4. The ray tracing method of claim 1 wherein treelet data structure corresponds to an instanced node.

5. A ray tracer comprising:
a stack configured to track traversal of an acceleration structure having a root node and comprising at least one instanced acceleration structure and at least one geometry acceleration structure;
a bounding volume-ray intersection tester configured to test whether rays intersect a bounding volume specified by the instanced acceleration structure;
a ray-geometry intersection tester configured to test whether rays intersect geometry specified by the geometry acceleration structure; and
stack management hardware that is configured to, in response to recognizing a stack entry that designates a node of the acceleration structure as an alternate root, at least temporarily restrict traversal of the acceleration structure to a subset of the acceleration structure with the node as the root thereof,
wherein the stack management hardware is further configured not to permit traversal of the acceleration structure to escape above the node designated as an alternate root when traversing upward from the subset of the acceleration structure with the node as the root thereof, even though that node designates a parent node in the acceleration structure.

6. The ray tracer of claim 5 wherein the stack entry includes an alternate root indicator that is copied from a compressed treelet corresponding to an acceleration structure node.

7. The ray tracer of claim 5 wherein the stack management hardware is further configured to initialize the stack to start traversal at the node designated as an alternate root instead of at the root.

8. The ray tracer of claim 5 wherein the bounding volume-ray intersection tester is further configured to concurrently test a plurality of bounding volumes bounding different portions of the geometry acceleration structure with a ray and indicate a bounding volume-ray intersection when any of the plurality of bounding volumes intersect the ray.

9. The ray tracer of claim 5 wherein the node comprises the instanced acceleration structure.

10. A non-transitory memory for use by a graphics processing system including a processor or processing circuit that automatically traverses trees or graphs represented by acceleration data structures to generate graphical information for storage and/or display, the non-transitory memory storing an acceleration structure comprising:
a root node that roots a tree or graph; and
at least one alternate root node within the tree or graph rooted by the root node, the at least one alternate root node being structured to root a subtree or subgraph of the tree or graph rooted by the root node,
the alternate root node being further structured to control the processor or processing circuit to contain traversals to within the subtree or subgraph and prevent the contained traversals by the processor or processing circuit from escaping beyond the subtree or subgraph the at least one alternate root node roots.

11. The non-transitory memory of claim 10 wherein subtree or subgraph represents spatially separated instances of a geometry and defines transforms that enable the processor or processing circuit to transform the geometry into each of those spatially separated instances.

12. The non-transitory memory of claim 10 wherein the acceleration structure contains a plurality of subtrees or subgraphs each rooted by a respective alternate root node.

13. The non-transitory memory of claim 10 wherein the acceleration structure represents geometry to be displayed by the graphics processing system.

14. The non-transitory memory of claim 10 wherein the acceleration structure represents polygons to be tested by the processor or processing circuit for intersection with rays.

15. The non-transitory memory of claim 10 wherein the processor or processing circuit comprises a path or ray tracer, and the acceleration structure represents polygons to be ray or path traced by the path or ray tracer.

16. The non-transitory memory of claim 10 wherein the acceleration data structure further comprises a treelet data structure including a pointer to a parent treelet data structure, an indicator declaring that the treelet data structure is a root for an acceleration structure traversal;
the indicator being configured so that in response to the processor or processing circuit recognizing the indicator, the processor or processing circuit conditions at least one traversal stack entry to prevent acceleration structure traversal from escaping to an acceleration structure node defined by the parent treelet data structure.

17. The non-transitory memory of claim 16 wherein the indicator comprises a single bit.

18. The non-transitory memory of claim 16 wherein the indicator is configured to control the processor or processing circuit to copy the indicator to the traversal stack entry.

* * * * *